(12) United States Patent
Littlejohn et al.

(10) Patent No.: US 11,669,847 B2
(45) Date of Patent: *Jun. 6, 2023

(54) ADJUSTING INVENTORY ALLOCATIONS AT DISCRETE TIMES WITHOUT ADJUSTING OVERALL INVENTORY ALLOCATIONS

(71) Applicant: iHeartMedia Management Services, Inc., San Antonio, TX (US)

(72) Inventors: Jeffrey Lee Littlejohn, Mason, OH (US); Daniel N. MacTiernan, Ocean City, NJ (US); Amit Aggarwal, New York, NY (US); Patricia D. Roberts, San Diego, CA (US); Kathleen Brougham, Dana Point, CA (US); Jeffrey Joseph Augustyn, Aliso Viejo, CA (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/559,186

(22) Filed: Dec. 22, 2021

(65) Prior Publication Data

US 2022/0114601 A1 Apr. 14, 2022

Related U.S. Application Data

(63) Continuation of application No. 15/606,955, filed on May 26, 2017, now Pat. No. 11,216,828, which is a
(Continued)

(51) Int. Cl.
*H04N 21/2665* (2011.01)
*G06Q 30/02* (2023.01)
(Continued)

(52) U.S. Cl.
CPC ......... *G06Q 30/02* (2013.01); *G06Q 30/0272* (2013.01); *H04N 21/2665* (2013.01);
(Continued)

(58) Field of Classification Search
CPC ......... H04N 21/2747; H04N 21/23424; H04N 21/25883
(Continued)

(56) References Cited

U.S. PATENT DOCUMENTS 5,778,187 A 7/1998 Monteiro et al.
5,822,735 A 10/1998 De Lapa et al.
(Continued)

OTHER PUBLICATIONS

Shermach, Kelly; Electronic Coupon Program Offers Data-Base Potential; Sep. 25, 1995; Marketing News; 3 pgs.

*Primary Examiner* — Mushfikh I Alam
(74) *Attorney, Agent, or Firm* — Garlick & Markison; Edward J. Marshall

(57) ABSTRACT

A log file including prediction information specifying a local advertisement content allocation amount and a general advertisement content allocation amount over a predetermined duration of time is received. A chronological schedule designating media content spots and advertising spots for the predetermined duration of time is also received. It is determined that a sold amount of local advertisement content during a particular time period, which is less than the predetermined duration of time, is insufficient to fill the local allocation during that time period, A portion of the local allocation is reallocated to the general allocation for the particular time period, while leaving the local and general allocation amounts unchanged over the predetermined duration of time. A program log is generated in accordance with the prediction information and the reallocating.

20 Claims, 15 Drawing Sheets

Related U.S. Application Data continuation-in-part of application No. 14/928,145, filed on Oct. 30, 2015, now abandoned, and a continuation-in-part of application No. 14/076,420, filed on Nov. 11, 2013, now Pat. No. 10,346,884.

(60) Provisional application No. 62/144,825, filed on Apr. 8, 2015.

(51) Int. Cl.
  *H04N 21/262* (2011.01)
  *H04N 21/458* (2011.01)
  *H04N 21/44* (2011.01)
  *H04N 21/81* (2011.01)
  *G06Q 30/0272* (2023.01)

(52) U.S. Cl.
  CPC ....... *H04N 21/26258* (2013.01); *H04N 21/44* (2013.01); *H04N 21/458* (2013.01); *H04N 21/812* (2013.01)

(58) Field of Classification Search
  USPC .......................................................... 725/97
  See application file for complete search history.

(56) References Cited

U.S. PATENT DOCUMENTS

| | | | |
|---|---|---|---|
| 5,983,005 | A | 11/1999 | Monteiro et al. |
| 6,035,280 | A | 3/2000 | Christensen |
| 6,119,163 | A | 9/2000 | Monteiro et al. |
| 6,185,541 | B1 | 2/2001 | Scroggie et al. |
| 6,324,519 | B1 | 11/2001 | Eldering |
| 6,757,662 | B1 | 6/2004 | Greenwald et al. |
| 6,885,994 | B1 | 4/2005 | Scroggie et al. |
| 8,955,025 | B1 * | 2/2015 | Hundemer ....... H04N 21/26216 725/116 |
| 9,479,809 | B1 * | 10/2016 | Hundemer ....... H04N 21/26241 |
| 9,788,034 | B1 * | 10/2017 | Hundemer ......... H04N 21/2625 |
| 2006/0287912 | A1 | 12/2006 | Raghuvamshi |
| 2006/0287915 | A1 | 12/2006 | Boulet |
| 2009/0241142 | A1 * | 9/2009 | Schuster .............. H04L 65/762 725/32 |
| 2010/0037253 | A1 | 2/2010 | Sheehan |
| 2011/0029373 | A1 | 2/2011 | Steelberg et al. |
| 2011/0078023 | A1 | 3/2011 | Aldrey |
| 2012/0158461 | A1 | 6/2012 | Aldrey |
| 2013/0097629 | A1 | 4/2013 | Popescu |
| 2013/0144723 | A1 | 6/2013 | Green |
| 2014/0067528 | A1 * | 3/2014 | Littlejohn .............. G06Q 30/02 705/14.49 |
| 2016/0301984 | A1 * | 10/2016 | MacTiernan ..... H04N 21/26258 |

* cited by examiner

ADJUSTING INVENTORY ALLOCATIONS AT DISCRETE TIMES WITHOUT ADJUSTING OVERALL INVENTORY ALLOCATIONS

CROSS REFERENCE TO RELATED APPLICATIONS

The present U.S. Utility patent application also claims priority pursuant to 35 U.S.C. § 120 as a continuation of U.S. Utility application Ser. No. 15/606,955, entitled "MANAGING LOCAL AND GENERAL ADVERTISEMENT SPOT ALLOCATIONS", filed May 26, 2017, scheduled to issue as U.S. Pat. No. 11,216,828 on Jan. 4, 2022, which is a continuation-in-part of U.S. Utility application Ser. No. 14/928,145, entitled "MANAGING LOCAL AND GENERAL ADVERTISEMENT SPOTS ALLOCATIONS", filed Oct. 30, 2015, which claims priority pursuant to 35 U.S.C. § 119(e) to U.S. Provisional Application No. 62/144,825, entitled "MANAGING LOCAL AND GENERAL ADVERTISEMENT SPOT ALLOCATIONS", filed Apr. 8, 2015, all of which are hereby incorporated herein by reference in their entirety and made part of the present U.S. Utility patent application for all purposes.

U.S. Utility application Ser. No. 15/606,955 also claims priority pursuant to 35 U.S.C. § 120 as a continuation-in-part of U.S. Utility application Ser. No. 14/076,420, entitled "SPLIT SPOT BREAKS", filed Nov. 11, 2013, now U.S. Pat. No. 10,346,884 on Jul. 9, 2019, which is hereby incorporated herein by reference in its entirety and made part of the present U.S. Utility patent application for all purposes.

FIELD

The present disclosure relates generally to broadcast media inventory, and more particularly to managing the allocation of broadcast media inventory between local spot blocks and general, or network, inventory.

BACKGROUND

Advertisements, 'advertisement spots,' or simply 'spots,' may be broadcast in blocks, also referred to as 'spot blocks.' The advertisements may include local advertisement content, as well as more general, or non-local, advertisement content. The general advertisement content may be in the form of national advertising for a larger demographic audience as compared to local demographics, as well as may include public service announcements, or block fill (which for example, in certain mediums, such as Internet broadcasts, may be less expensive public-domain content while paid advertisement content may be used in terrestrial broadcasts).

Such spot blocks may be scheduled during breaks between programming that is being broadcast to multiple different media outlets or stations. It is generally desirable to have different advertisements played to different audiences having different demographics. Different spots can be inserted in different spot blocks played during the same block of time, so a spot block broadcast over the air to a radio audience may include different spots than a spot block streamed to an Internet audience, even though the media program is the same.

In general, an allocation of local advertisement content and general advertisement content is sought to maximize broadcast airplay, and to be able to dynamically adjust the allocations of the different forms of advertisement content.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

Figure 1:
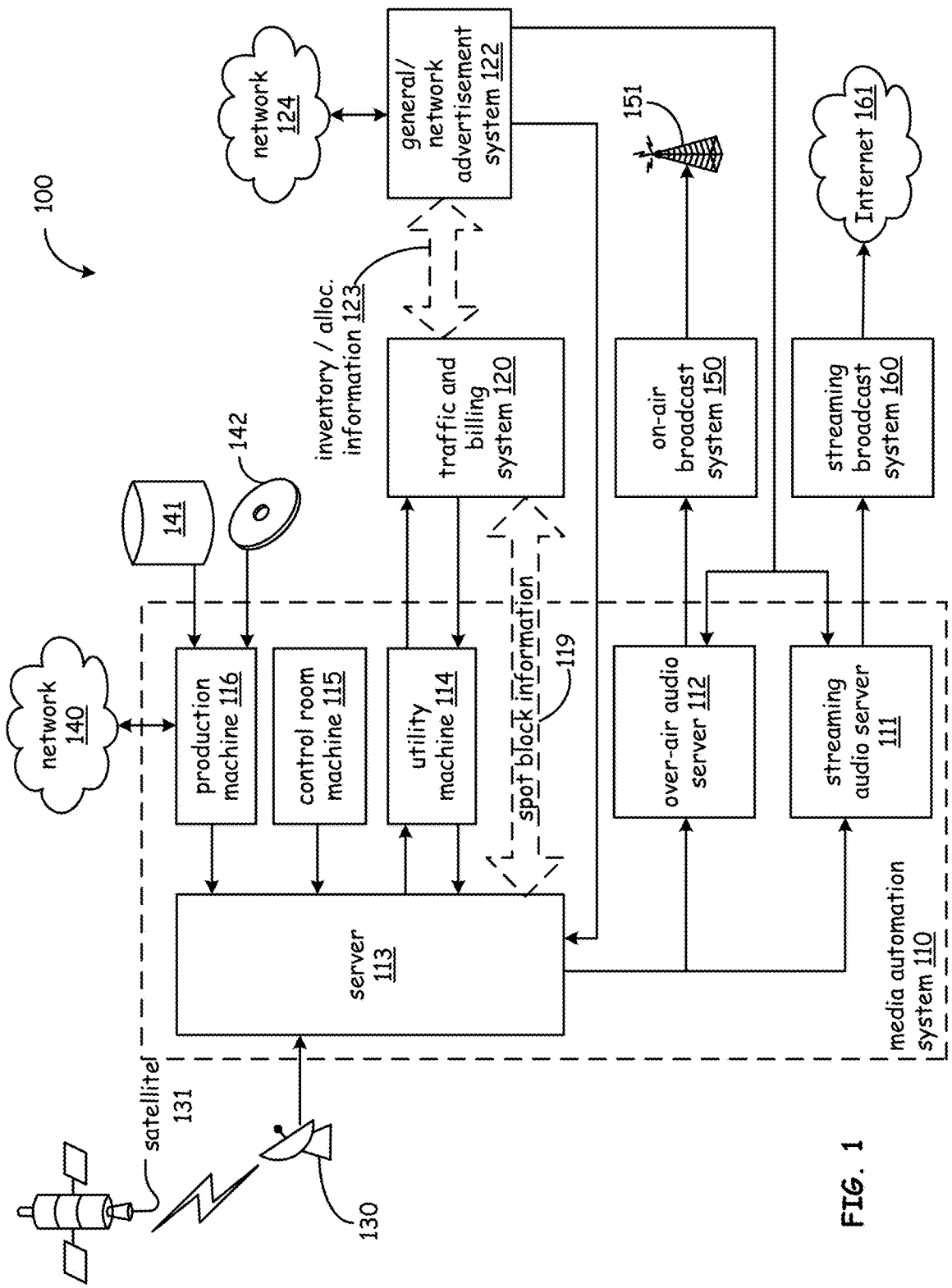
FIG. 1 is a system block diagram according to various embodiments of the present disclosure.

The following is a detailed description of embodiments of the disclosure depicted in the accompanying drawings. The embodiments are presented in sufficient detail to clearly communicate the disclosure to one of ordinary skill in the art. However, the amount of detail offered is not intended to limit the anticipated variations of embodiments; on the contrary, the intention is to cover all modifications, equivalents, and alternatives falling within the spirit and scope of the present disclosure as defined by the appended claims.

A media broadcasting system can include a mechanism by which anticipated excess advertising inventory can be allocated for use by an external advertising system. This allocation is referred to interchangeably as "allocation," "advertising allocation," "advertisement content allocation," "inventory allocation," or using a similar term derived from "allocation." The allocation can include a designation of part of the total inventory to "local" inventory, part of the total inventory to "general" inventory, and a buffer designated for either local inventory or general inventory based on either a "first-come-first-served" basis, on a priority basis, or as otherwise determined. A media traffic system can communicate with the external advertising system to dynamically adjust the inventory allocation based, at least in part, on local and network sold-inventory levels. Additionally, a media automation system can work in conjunction with the billing system and the external advertising system to permit last minute adjustments to the allocation, sometimes referred to as "early return."

As used herein, the term "inventory," unless otherwise required by the context in which it is used, refers to broadcast media time sold or potentially available for sale to advertisers. "Total Inventory" refers to all inventory available during a given period of time for a given media broadcast station or stations. For example, total inventory may refer to all inventory during a particular week for a particular broadcast station. "Local Inventory," unless otherwise required by the context in which it is used, refers to inventory sold or offered for sale by a particular broadcaster or broadcast station, and can include time sold or offered for sale to advertisers wishing to provide advertisements of worldwide, national, regional, or local interest. The terms "general inventory" and "network inventory," are used interchangeably herein to refer, in contrast to "local inventory" to inventory sold or made available to advertisers by a reseller or some other entity besides a broadcaster or broadcast station. Usually general, or network, inventory is purchased in bulk, and has a lesser monetary value to the broadcaster than local inventory.

Advertising is usually scheduled for broadcast in groups of individual advertising spots, called "spot blocks". As used herein, an undivided length of time allocated to playout and broadcast of network inventory can be represented in a broadcast log as a single "spot," from the perspective of the broadcaster, even though from the perspective of the network advertising system multiple general advertisements can be included in that single spot. Thus, a local spot may be a network spot block. Unless the context requires otherwise, or explicitly mentioned, the term "spot" is used from the broadcaster's perspective.

In some instances, a scheduled spot may need to be removed from the schedule, sometimes referred to as being "bumped," for any of various reasons. Advertisement spots removed, pulled-back, or "bumped" from earlier spot blocks can be, in some cases, almost immediately rescheduled for inclusion in suitable, later scheduled spot blocks. In some case, for example, a "bumped" spot allocated for playout of network inventory, can be reassigned to local inventory. A rules-based process for handling under-filled spot blocks and bumped spots can be implemented with little or no human intervention, thereby allowing quick placement of bumped spots into available spots based upon an advertisement content allocation prediction, which includes a local advertisement content allocation amount, and a general advertisement content allocation amount. In various embodiments, such a process can be implemented to enable near-real-time filling of an underfilled spot block to enhance realization of revenue from paid spot blocks, whether local or general in nature.

In various embodiments, the advertisement content allocation prediction alleviates or removes a buffer-in-time between the local advertisement content allocation amount and the general advertisement content allocation amount. In other words, due to the labor intensive manner to establish an advertisement content allocation prediction, such estimates were set for comparatively large, predetermined durations. In effect, advertising revenue was left unrealized because the effective advertisement prediction rate at best would be, for example, 90% of the available advertisement spots. Being able to accommodate near-real-time filling of a missing or available advertisement spot blocks in either local or general content allocation to enhance realization of revenue from paid spot blocks, whether local or general in nature, as is discussed in further detail with respect to FIGS. 2 thru 15.

Available advertisement content or spots can be selected from a collection, or pool, of available spots, which may include previously removed, or "bumped," from other spot blocks. In some embodiments, the traffic and billing system sends a bumped-spot update to a general advertisement system identifying a general, or national, advertisement spot that has been removed from a station log, and the general advertisement system marks the spots as available, or otherwise collects the advertisement spots.

In some implementations, at least one parameter associated with a spot-block is included in a request sent by the traffic and billing system. The parameter can include any of various parameters associated with the spot block to be filled, including the spot block start time and end time, a station identifier on which the spot block is to be played, the date on which the under-filled spot block is to be played, the length to fill, and a spot-block identifier.

The traffic and billing system can use these parameters to assist in selecting advertisement spots are later identified to a media automation system, and to help in ranking the potential advertisement spots. In some embodiments, however, advertisement spots are ranked based on their rate in addition to, or instead of, using the spot block parameters.

Referring to FIG. 1, a media broadcasting system 100 according to various embodiments of the present disclosure will be discussed. Media broadcasting system 100 includes media automation system 110, for example a NexGen® automation system, which can be used to control and automate various media broadcast functions; and traffic and billing system 120, for example a Viero® traffic system, which may be used to provide control for various traffic and billing functions such as entering and editing orders, and scheduling spots. Media Broadcasting System 100 also includes a general advertisement system 122, sometimes referred to as an external advertisement system or a network advertisement system, which may be used for provisioning general advertisement content for broadcast airplay via the traffic and billing system 120. The traffic and billing system 120 and the general advertisement system 122 may communicate via a network interfaces with each other to coordinate local and general advertisement content, as is discussed in detail with reference to the following figures.

Media broadcasting system 100 also includes streaming broadcast system 160, through which a streaming broadcast of media content can be provided to a network, such as Internet 161. Media broadcasting system 100 also includes on-air broadcast system 150, through which media content can be broadcast, such as via a broadcast tower 151, and various media sources such as an individual source media 142, bulk media storage 141, programming from another market and received via network 140, and programming broadcast via satellite 131, which can be received via satellite receiver 130.

Media automation system 110 can also include production machine 116, which receives media content from network 140, bulk storage 141, and individual source media 142; control room machine 115, and utility machine 114, each of which is connected to server 113. Media automation system 110 can also include an over-air media server 112, for example a radio station playout device, which provides media content to on-air broadcast system 150; and streaming media server 111, which provides media content to streaming broadcast system 160. Server 113 can provide audio, video, or mixed media content to one or both of over-air media server 112 and streaming media server 111.

In at least one embodiment, one or more of the illustrated servers can be implemented as virtual servers implemented on the same hardware as another of the illustrated servers. In each case, however, implementation of a server requires the use of hardware, and general reference to a "server," unless otherwise explicitly stated or required by the context, includes hardware components used to implement the server functionality. Furthermore, various distributed processing techniques can be used to spread functionality of one or more of the illustrated servers across multiple different machines.

In various embodiments, programming provided by streaming media server 111 to streaming broadcast system 160 is the same programming provided by over-air media server 112 to on-air broadcast system 150. In many instances, however, particular advertisement spots included in the various spot blocks provided to on-air broadcast system 150 and streaming broadcast chain 160 can vary, even though the length and timing of the spot blocks themselves are generally consistent with each other.

In some embodiments, media automation system 110 can be, for example, a radio automation system that may control a media content broadcast via multiple different radio stations in a single market, with some or all system elements and subsystems co-located in a single physical facility. In other embodiments, media automation system 110 can be a radio automation system used to provide control of radio stations in different markets, in different locations, or via different distribution channels.

In an illustrated embodiment, media automation system 110 may be used to control media broadcast over-the-air via on-air broadcast system 150 and broadcast tower 151, and streaming media may be provided to the Internet 161 via streaming broadcast system 160. Broadcast stations and delivery media in addition to those illustrated in FIG. 1 can also be controlled by media automation system 110. It should be appreciated that media automation system 110 can be used with radio, television, and other media channels used to broadcast programming via multiple different stations or outlets.

Media automation system 110 can obtain media to be broadcast from various sources. For example, production machine 116 can obtain information from broadcasts in other markets via network 140. Production machine 116 can also obtain media from database 141, which may be a database local to production machine 116, or local to another server or machine that is part of media automation system 110. In other embodiments database 141 can be maintained by a third-party media provider, which can be remote from media automation system 110. Production machine 116 can also obtain media to be broadcast from individual media sources, such individual source media 142, which may include any of various non-volatile media storage elements, including but not limited to optical disks, for example, compact discs (CDs), digital video disks (DVDs), various types of magnetic and electromagnetic storage media, or the like.

Production machine 116 can provide some or all of the media to be broadcast to server 113. In addition to the media provided to server 113 from production machine 116, satellite receiver 130 can also provide satellite content to be inserted into a broadcast via over-air media server 112 and streaming media server 111. Server 113 can also receive media or other content to be broadcast from control room machine 115. Control room machine 115 may include a studio in which a live 15 broadcast is being generated, such as a talk show or other similar live program, but control room machine 115 can also provide media to server 113 other than live media.

Additionally, control room machine 115 can provide server 113 with various control functions, and in some cases an operator can manually add or remove spots, programming, and other content that server 113 has previously slotted for broadcast. Thus, for example, an operator in control room machine 115 may determine that a previously scheduled advertisement spot in a particular advertisement spot block is not to be broadcast for any of various reasons. Upon making that determination, control room machine 115 can be used to send a signal to server 113. In response to the signal, server 113 can remove the advertisement spot from its previously scheduled spot block. In some embodiments, the removed, or "bumped" advertisement spot is not delivered to over-air media server 112 for on-air broadcast, nor is it delivered to streaming media server 111 for streaming broadcast.

Traffic and billing system 120, in some embodiments, may be connected to server 113 via a utility machine 114. In other embodiments, traffic and billing system 120 may be connected to server 113 through other machines, for example a control room machine 115, production machine 116, or directly connected to server 113. In other embodiments, traffic and billing system 120 and server 113 can be included in a single machine, or collection of machines that are co-located or connected in a distributed fashion. In yet further embodiments, traffic and billing system 120 can include local instances or subsystems associated with one or more media stations, and a backend subsystem used to provide centralized control or services to each of the local instances or subsystems.

Also, traffic and billing system 120 may be connected to the general advertisement system 122. The general advertisement system 122 can, in various embodiments, operate to provide network inventory directly to media automation system 110 for broadcast in accordance with an advertisement content allocation communicated by the traffic and billing system 120. For example, if traffic and billing system 120 determines a first allocation in which 5% of total inventory is reserved for broadcast of network inventory, traffic and billing system 120 can notify general advertisement system 122 of the determined allocation amount. Traffic and billing system 120 can also provide a broadcast log to server 113 of media automation system 110. The broadcast log can include local entries, which specify spots reserved for playout of local inventory by media automation system 110, and placeholder, or network, entries specifying particular portions of spot blocks reserved for playout of network inventory by general advertisement system 122.

The media automation system can play out media content for broadcast in accordance with the broadcast log using, for example, over-air media server 112 or streaming media server 111. During times designated by the broadcast log as reserved for broadcasting network inventory, media automation system 110 can temporarily pause playout of local inventory while general advertisement system 122 plays out network inventory. Pausing playout can be implemented by playing out silence, for example using a dead roll, by pausing execution of a playout mechanism, by switching playout paths so that local inventory being played out is effectively routed to a destination other than a broadcast system, or otherwise. In various embodiments, at the expiration of the time reserved for playout of network inventory, media automation system resumes playout of local inventory.

The times at which media automation system pauses and resumes playout of local inventory can be nominally determined by entries in the broadcast log generated by traffic and billing system 120. As discussed subsequently in greater detail, some embodiments provide for early return to local inventory playout, where the term "early return" refers to resuming playout of local inventory prior to the nominal time specified in the broadcast log. An early return can be invoked, for example, if the general advertisement system 122 does not have sufficient network inventory to fill the time reserved for playout of network inventory, of if a disruption in communication or malfunction is detected by media automation system 110.

The general advertisement system 122 can coordinate, orders, and catalogs general advertising content that is in turn accessible through the system 122 for broadcast airplay. As contrasted to "local advertisement content," general, or network, advertisement content or spots or inventory refers to advertisements or other inventory provided by advertising networks or services. Network or general advertising systems and services can in some embodiments, include systems used by aggregators who purchase unsold advertising space in bulk from broadcasters, and re-sell advertising inventory to advertisers at a discount in exchange for the advertisers relinquishing some control of exactly where and when their advertisements will run. The general advertisement system 122 may access general advertisement content through a network interface to the network 124, or may otherwise be routed or provided by other network pathways, such as a wide area network, local area network, personal area network, etc.

In various embodiments, general advertisement system 122 can provide traffic and billing system 120 with network inventory information 123 at various different points in time. The network inventory information 123 can be transmitted by general advertisement system 122 in response to a request by traffic and billing system 120, in response to a change in the network inventory as determined by general advertisement system 122, or otherwise. Traffic and billing system 120 can, for example, use network inventory information 123 received during a broadcast-log planning stage to set an inventory allocation for use in generating a broadcast log used by media automation system 110. In various embodiments, inventory allocations can be determined on a station-by-station basis, on a regional basis, or otherwise. In some embodiments, an initial allocation can be determined on a multi-station basis, and later alteration to the inventory allocations can be modified on a station-by-station basis. In other embodiments, the initial inventory allocation used by traffic and billing system 120 used to generate an initial broadcast log need not take network inventory information 123 into account when establishing the initial inventory allocation.

General advertisement system 122 can also transmit adjusted network inventory information 123 to traffic and billing system 120 after traffic and billing system has already established a first inventory allocation, and in some cases after traffic and billing system 120 has already generated an initial broadcast log based on the initial inventory allocation and provided the initial broadcast log to media automation system 110. Traffic and billing system 120 can use the adjusted network inventory information 123 to generate an adjusted inventory allocation that takes into account the changes in the network inventory. The adjusted inventory allocation can then be used by traffic and billing system 120 to alter the initial broadcast log to account for the changes in network inventory.

In at least one embodiment, the inventory allocation used by traffic and billing system 120 to generate either an initial or subsequent broadcast log establishes a portion of total inventory is to be designated or reserved for local inventory, what portion of total inventory is to be designated or reserved for network, or general, inventory, a size to use for an inventory buffer, and whether or not the inventory buffer will be a straight-line buffer, or a variable buffer.

In addition to being connected to traffic and billing system 120, general advertisement system 122 can also be connected to media automation system 110 via a communications network, allowing general advertisement system 122 to communicate directly with media automation system 110. In FIG. 1, the connections are illustrated between general advertisement system 122, over-air media server 112, and streaming audio server 111, to illustrate that general advertisement system 122 can communicate with local media servers used by individual stations.

This direct connection can, in some embodiments, facilitate general advertisement system 122 providing network inventory directly to over-air media server 112 or streaming audio server 111 for broadcast. In some such embodiments, over-air media server 112 or streaming audio server 111 broadcast content in accordance with a broadcast log provided by traffic and billing system 122 via server 113. The broadcast log can include local entries specifying local inventory to be played out in particular spot-blocks, and placeholder entries corresponding to external inventory to be played out by an external advertisement system, such as general advertisement system 120. During times, or spots, designated for use by the external advertisement system, over-air media server 112 and streaming audio server 111 can temporarily stop playing-out local content, and deliver network inventory received from general advertisement system 122 to their respective broadcast channels, on-air broadcast system 150 or streaming broadcast system 160. In various embodiments, this delivery can be done at a local level, using a network advertisement appliance that is an instance or subsystem of general advertisements system 122 collocated with a local instance or subsystem of media automation system 110, although collocation is not required.

In some embodiments, although not specifically illustrated, general advertisement system 122 is connected directly to server 113 instead of, or in addition to being connected to over-air media server 112 and streaming audio server 111. Some such embodiments permit communication between a central media automation system controlling multiple media broadcast stations, individual instances of a media automation system assigned to particular broadcast stations, or a combination thereof. In some such embodiments, Traffic and billing system 120 may communicate spot block information 119 to server 113, usually in the form of a broadcast log, and server 113 can communicate changes made to spot block information 119 back to traffic and billing system 120.

In various embodiments, spot block information 119 provides a mechanism that can include requests for identification of potential advertisement spots available for inclusion in predetermined portions of a broadcast airplay. The spot block information 119 can include, for example, spot reservations for local advertisement content and spot reservations for general, or network advertisement content.

In general, traffic and billing system 120 can be used to provide control and monitoring of the sale and scheduling of advertisement spots, and to determine which advertisement spots are to be played on which stations at particular times. This information can be provided in the form of a log file in some embodiments. Media automation system 110 can use server 113 to gather programming and media information from various sources, and combine that information with spot block information 119 to generate a log file indicating a substantially complete representation of which media and spots are to be broadcast. The log file and related information can be provided to both over-air media server 112 and streaming media server 111 for broadcast over their respective chains.

For example, programming provided from a satellite feed received through satellite receiver 130 will generally have breaks in its programming. The beginning and end of these breaks can be identified by dual-tone multi-frequency (DTMF) tones provided with the programming, or determined through various other means. Spot block information 119, can include the identity of various spots that are available to be played on particular stations during particular times, the priority of the spots in relationship to each other, and other similar information, which can be used to schedule spots into appropriate breaks in the programming.

In some instances, advertisement spots played over streaming broadcast system 160 can be different than spots played over on-air broadcast system 150, even though the programming and the breaks between various programming and media items are the same. Thus, a first spot block to be broadcast over on-air broadcast system 150 by over-air media server 112 may include three spots to be played from 10:00 AM to 10:03 AM on a particular date. A second spot block to be broadcast over streaming broadcast system 160 may include two of the same spots included in the first spot block, with the third spot reserved for an advertisement targeted to an Internet audience via the Internet 161.

Due to various circumstances, one or more spots, and in some cases entire spot blocks, may be removed from a particular spot block due to allocation conflicts between the local advertisement content allocation and the general advertisement content allocation.

With respect to general, or network advertisement content allocation, the traffic and billing system 120 can be used to resolve allocation conflicts, and notify the general advertisement system 122 if a particular general advertisement spot, or general advertisement spot block, is to be the removed due to preference for airplay for a local advertisement content.

Because media broadcast stations generally derive revenue from broadcasting paid advertisement spots, any advertisement content spots that are removed, whether those spots were used to schedule local advertising or reserved for network advertisements, should be later reinserted into the media stream if possible, so that revenue for the advertisement spots, or content, is not lost. But because different spots can be included in corresponding spot blocks on different stations, or on the same station being broadcast over different chains, reinserting bumped spots can require a close coordination between the media automation system 110 and the traffic and billing system 122. Additionally, some spots, whether paid or not, may have a higher priority than other similar spots, and are generally referred to herein as "priority spots." In some cases, it is desirable to reinsert priority spots that have been removed from the media stream.

Close coordination can also be important to make sure that various scheduling and marketing parameters associated with reinserted priority spots, including local/network inventory allocations, are satisfied. In at least one embodiment, traffic and billing system 120 can maintain information regarding scheduled spots that should be played either at certain times of day, on certain days of the week, spots that should be played in conjunction with various other spots, spots having priority over other spots with the same or similar parameters, or spots whose placement in a spot block or is otherwise constrained. The information maintained by traffic and billing system 120 can include any instances of early-returns from spots designated for use by general advertisement system 122.

In some instances, particularly with regards to a streaming broadcast chain 160 provided through streaming media server 111, some of the advertisement spot blocks scheduled for play later in the day, may be under-filled, meaning that a sufficient number of spots have not yet been scheduled to fill the time allotted for a break between, or within, various different media programs. In some cases, if priority advertisement spots, e.g., paid advertisements, meeting the requirements of a particular under-filled spot block are not available, traffic and billing system 120 will insert unpaid or lower priority filler, e.g., a public service announcement, into the available space. However, if one or more of the previously bumped priority spots meet the criteria necessary for being broadcast in the under-filled spot block, those priority spots can be inserted into the under-filled spot block to allow media automation system 110 to recover revenue that may otherwise have been lost.

To make these previously bumped spots available for inclusion in under-filled spot blocks, server 113 can provide information to traffic and billing system 120 related to spots that have been removed. Traffic and billing system 120 can collect and store information about bumped spots that may be available for future inclusion in under-filled spot blocks. Over-Air media server 112 or streaming media server 111 can notify database 20 server 113 of under-filled spot blocks, and request server 113 to provide content to be included in those under-filled spot blocks. Server 113 can, in turn, request traffic and billing system 120 to search through its collection of available priority spots to identify potential spots that are available for inclusion in the under-filled spot block. Traffic and billing system 120 can return the requested information to server 113, which will in 25 some embodiments select which of the potential spots to be included in the under-filled spot block. Server 113 can provide the spot to the appropriate server for broadcast, and send a message back to traffic and billing system 120 indicating which of the potential spots were chosen for inclusion in the under-filled spot block. Traffic and billing system 120 can then update its list of available spots to indicate that a selected spot has already been 30 rescheduled for broadcast in the under-filled spot block.

In some embodiments, filling under-filled spot blocks is performed automatically, and on a time scale that can be impractical if human intervention or decision making is required. Thus, for example, an under-filled spot block in the following minutes can be filled with a spot bumped during the previous minutes. In some cases, a bumped spot can be placed in the next spot block playing on the same station if, for example, the next spot block includes unpaid filler, lower priority spots, or under other circumstances as desired.

It will be appreciated that various implementations of system 100 can be realized based on the teachings set forth herein, and are not limited to the exact configurations discussed with reference to FIG. 1. For example, although at least one embodiment includes separate traffic and billing systems 120, similar functionality can be provided using a single, integrated or system having one or more local or distributed processing, storage and communication elements. Thus, although embodiments including automation and traffic systems 120 and interaction with a general advertisement system 122 are primarily discussed herein, other embodiments can be implemented without the need for cooperation between separate 15 automation and traffic systems.

Figure 2:
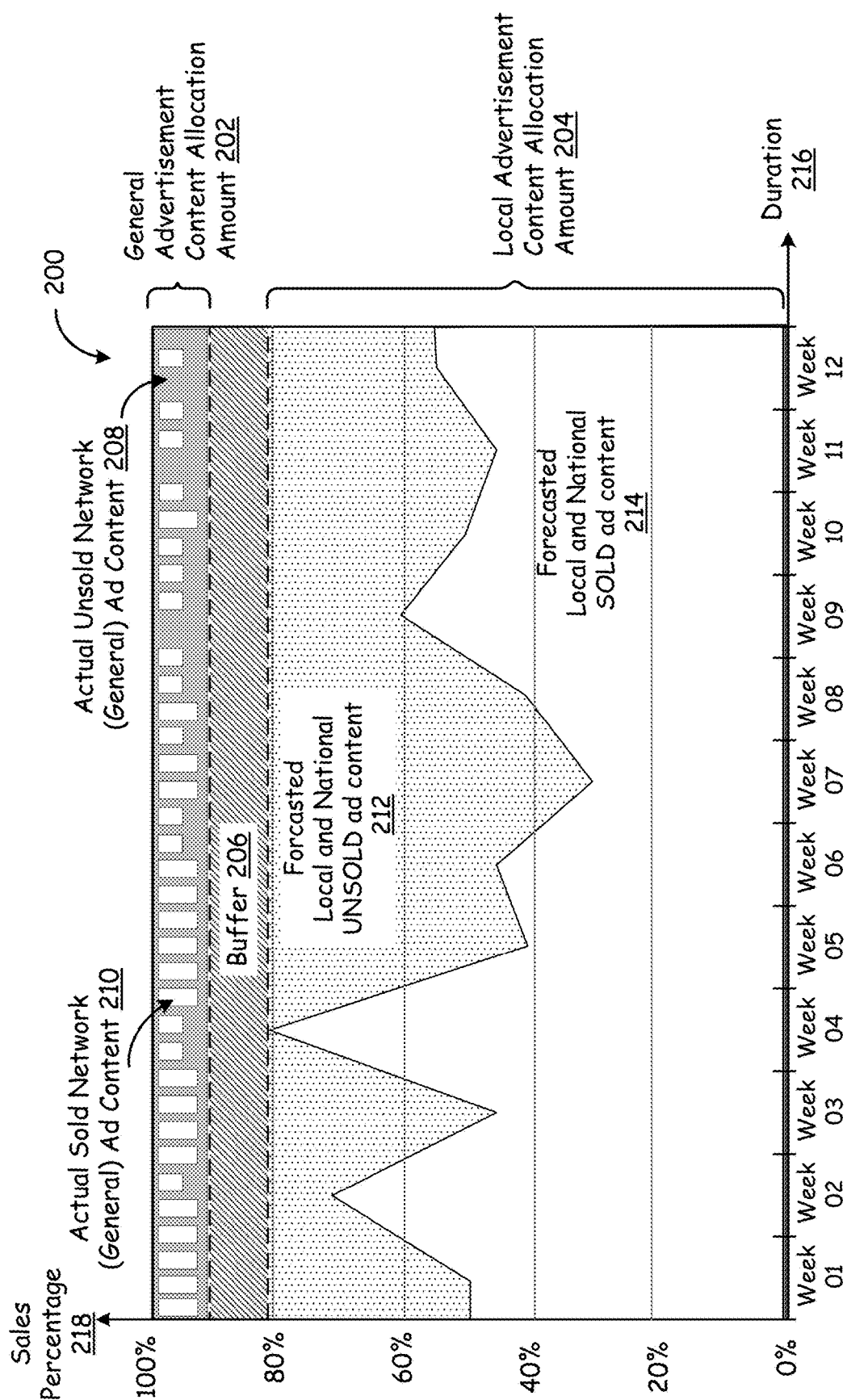
FIG. 2 is a graph illustrating a conservative straight-line advertisement content allocation according to various embodiments of the present disclosure.

Referring next to FIG. 2, a conservative straight line advertisement content allocation (conservative allocation) 200 is illustrated and discussed according to various embodiments of the present disclosure.

Conservative allocation 200 can be considered a conservative model because the local allocations provide for a generous buffer 206 that limits conflicts between general and local advertisement content over a predetermined duration 216. In the example of FIG. 2, the predetermined duration 216 is shown on a 12 week basis, but other bases, for example an annual, 12 month basis, can also be used. Conservative allocation 200, designates approximately ten-percent of the total inventory to general advertisement allocation amount 202, the local advertisement content allocation amount 204, which includes forecasted unsold local inventory 212 and forecasted sold local inventory 214, is given approximately eighty-percent of the allocation, leaving the buffer 206 with approximately ten-percent of the advertisement allocation. A desire exists to provide a flexible allocation to capture the allocation of the buffer 206 for revenue generation. Coupled with an unsold (or under-filled) amount—unsold local advertisement inventory 212 and unsold general advertisement content 208, the revenue loss from unsold inventory would be further compounded in the instance when, for example, sold general advertisement content 210 is available to be placed in inventory not allocated to either general advertisement content allocation amount 202 or local advertisement content allocation amount 204.

Conventionally, due to the long range budgetary practices, the allocation prediction had been set and left as a best estimate for the predetermined duration 216, and could not readily be adjusted due to the estimated revenues and management of the advertisement content pools. Accordingly, a dynamic allocation prediction is desired which permits (a) a conflict of the amount of local advertisement content to exceed the allocation for a predetermined period, and (b) an adjustment of the advertisement content allocation prediction to take place over a predetermined duration, which may be more granular than that associated with conservative allocation 200.

Figure 3:
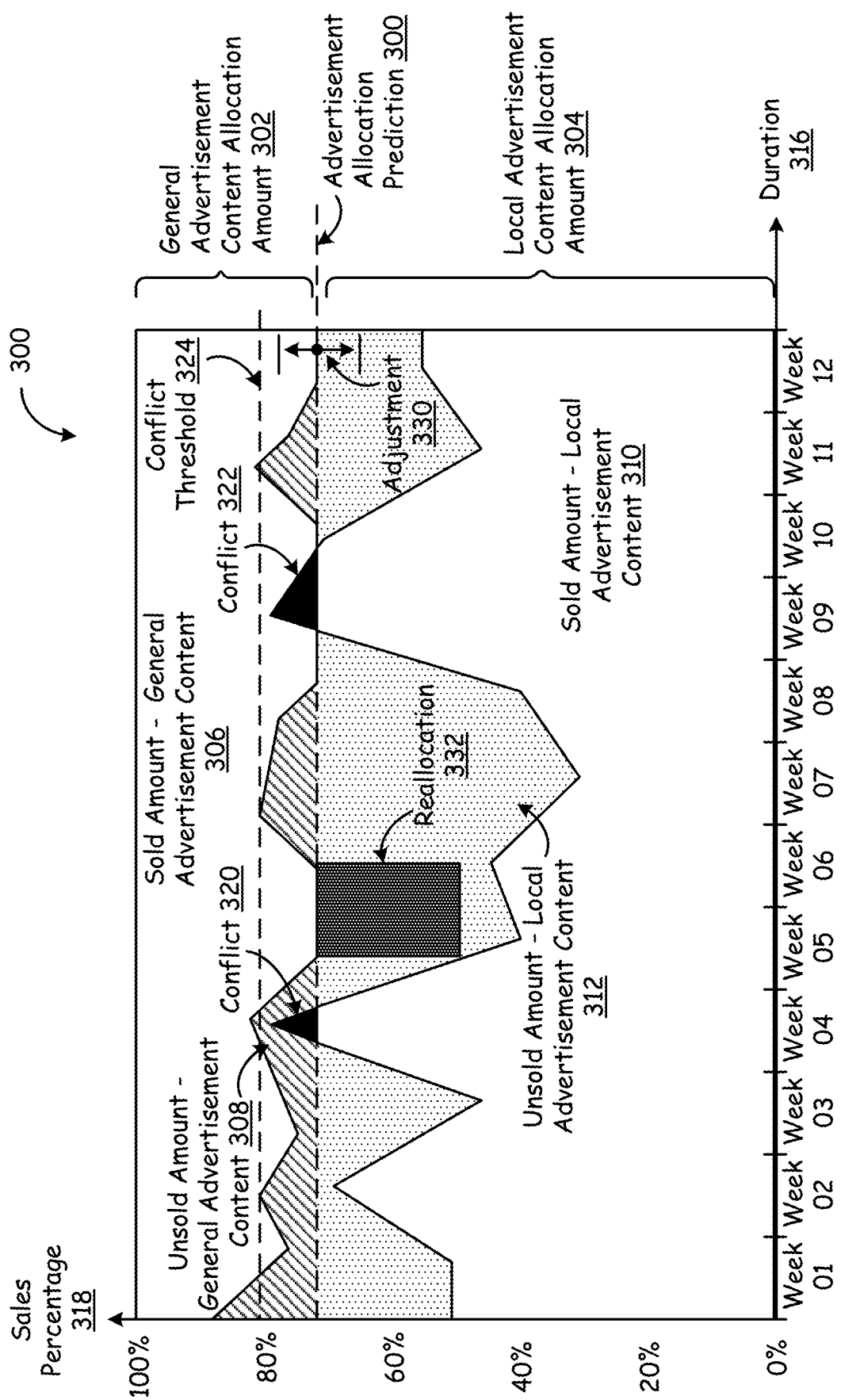
FIG. 3 is another graph illustrating an aggressive straight-line advertisement content allocation according to various embodiments of the present disclosure.

Referring next to FIG. 3, an aggressive straight-line advertisement content allocation prediction (aggressive allocation) 300 according to various embodiments of the present disclosure will be discussed. In aggressive allocation 300, an advertisement content allocation amount 304 provides for a general advertisement content allocation amount 302 and a local advertisement content allocation amount 304, which are substantially complementary to each other to take advantage of the total sales percentage 318. In at least one embodiment, aggressive allocation 300 provides little or no buffer between general advertisement content allocation amount 302 and a local advertisement content allocation amount 304, requiring tradeoffs, pullbacks, or temporary inventory reallocations if more than the estimated amount of either network inventory or local inventory is sold.

In the example of FIG. 3, the allocation amount 302 is approximately thirty-percent, while the allocation amount 304 for local advertisement content is approximately seventy-percent, although other allocations can be made based on anticipated inventory sales. By using an aggressive allocation 300, advertising revenue is captured that may otherwise be lost with a buffer 206 (see FIG. 2). With scheduling of advertisement content, the general advertisement content allocation amount 302 includes an unsold amount 308 and a sold amount 306, which occupy the allocation amount 302. The local advertisement content allocation amount 304 includes an unsold amount 312 and a sold amount 310.

Local and general conflicts 320 and 322 arise when the populated local advertisement spots for the predetermined duration 316 exceed the general advertisement content allocation amount 302 and conflicts with the advertisement content as a result. In the conflict resolution of the present embodiment, the conflict 320 and 322 may be resolved by pulling-back the general advertisement content, such as with conflict 322, and using in later content scheduling, or may reside in the scheduled area because the region is in an unsold amount 308 such as with conflict 320. Moreover, the unsold or under-filled amount of the local advertisement content 312 may be deemed a reallocation 332 in which general advertisement content may be used to fill with under-filled space.

Also, when a number of populated local advertisement spots for the predetermined duration 316 exceed the general advertisement content allocation amount 302 beyond a conflict threshold 324, the advertisement content allocation prediction 300 may be dynamically adjusted for the local advertisement content allocation amount 304 and the general advertisement content allocation amount 302 to reduce the number exceeding the conflict threshold 324.

As used herein, unless otherwise specified or required by context, the term "conflict" is used to refer to a scenario in which local inventory sell-out spikes, and the amount of local inventory encroaches on the portion of the total inventory allocated to network inventory. For example, if a commercial order comes in and there is no inventory/space available to schedule the commercial order into the local/national inventory. Traffic and billing system 120 can determine that it is better to book this spot at the expense of the network allocation, but will, in some embodiments, bump a network spot only if information received from the general advertisement system 122 indicates that network inventory has not sold out. If network inventory has not sold out the bumped network spot can, in many cases, be pulled back without significant adverse impact on general advertisement system 122.

In this manner, accommodation of the greater of the local advertisement content orders may be accommodated to capture advertising revenue otherwise lost or limited. For example, assume that more local inventory (higher revenue to broadcaster) has been sold than the amount allocated, and that some of the allocated network inventory (lower revenue to broadcaster) remains unsold. Absent inventory reallocation revenue from the sale of local inventory might be lost to the broadcaster. If, however, more local inventory (higher revenue to broadcaster) has been sold than the amount allocated, but the allocated network inventory is sold out (lower revenue to broadcaster), the revenue to the broadcaster can be said to be limited without reallocation, due to the lower value of the network inventory to the broadcaster.

In some embodiments, the portion of total inventory reserved or designated for local inventory used can be re-designated for general, or network use. In some such embodiments adjusting the allocation in favor of network inventory can provide a mechanism for placing network spots that were bumped based on an allocation in favor of local inventory.

With the adjustment 330, a change request may be sent to indicate to the system an adjustment of the advertisement content allocation prediction for at least the general advertisement content allocation 302 and correspondingly for the local advertisement content allocation amount 304. As should be appreciated, the conflict threshold 324 and the advertisement allocation prediction 300 may be adjusted accordingly, for example to take advantage of advertising revenue.

Figure 4:
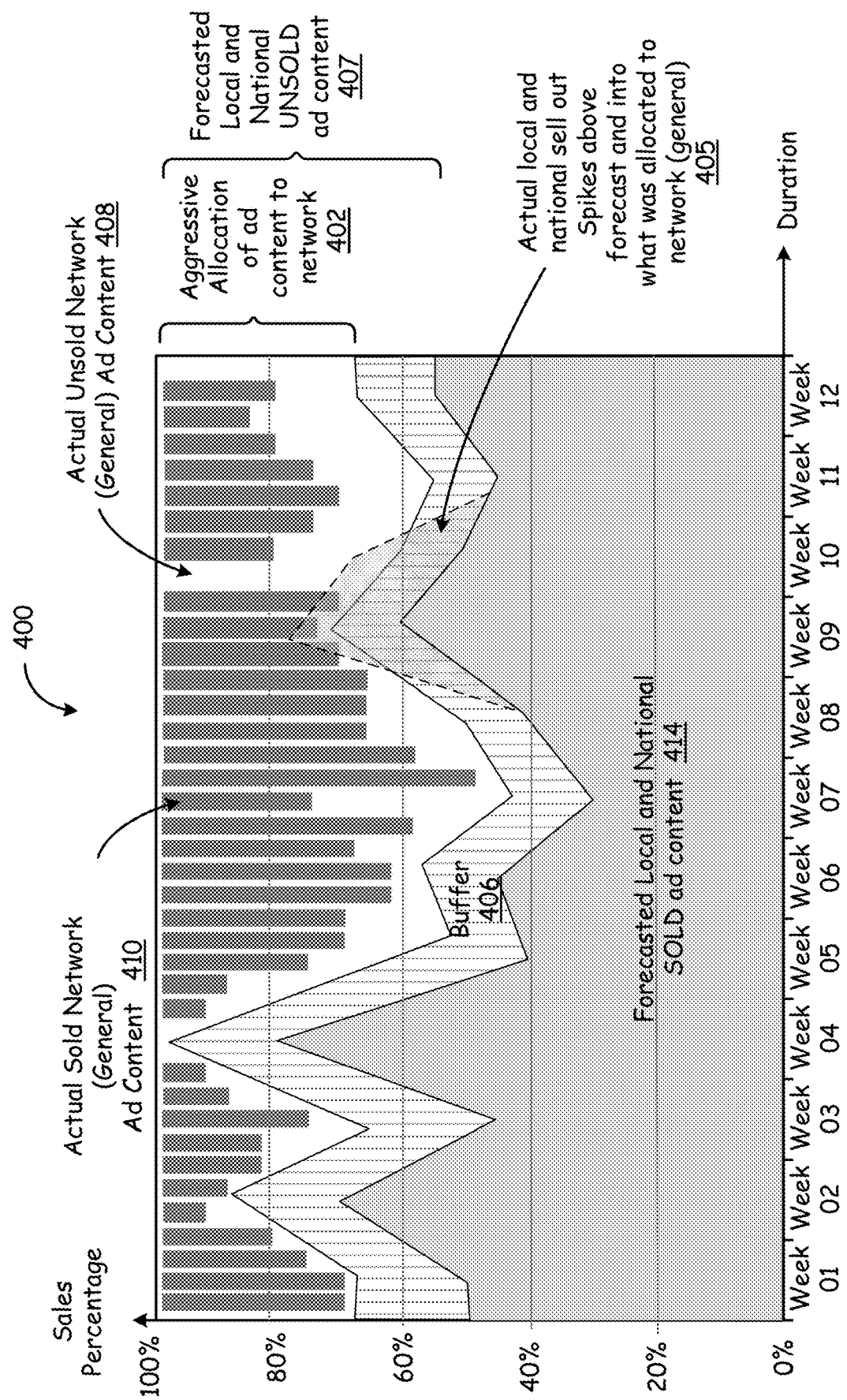
FIG. 4 is a graph illustrating a variable advertisement content allocation based on forecast local sellout that varies from one week to another, according to various embodiments of the present disclosure.

Referring next to FIG. 4 a graph illustrating a variable advertisement content allocation (variable allocation) 400 based on forecast local sellout that varies from one week to another, be discussed according to various embodiments of the present disclosure Various embodiments of variable allocation 400 designate variable portions of the total inventory to local inventory allocation 414 and network inventory allocation 402. Variable allocation 400 includes a buffer 406, which can be assigned a 20% buffer width, for example, that can vary directly with estimated local inventory allocation 414. In at least one embodiment, the network inventory allocation 402 can be determined by adding the portion of total inventory reserved for local inventory, adding the buffer width, and subtracting the result from the total inventory to determine the remaining portion of the total inventory to be designated for broadcast of network inventory. Stated in the inverse, the portion of total inventory allocated to network inventory 402 can be described as the forecast unsold local inventory 407 minus the width of buffer 406.

Consider for example, week 7, where the local inventory allocation 414 has a negative peak at approximately 35%. Adding 20% for the width of buffer 406 to local inventory allocation 414 leaves approximately 45% of the total inventory available for network inventory 402. Similarly, during week 4, the local inventory allocation 414 is peaks at approximately 78%, and adding in a 20% buffer width leaves approximately 2% of the total inventory available for network inventory broadcast.

Note that during weeks 9-10, the actually sold local inventory 405 exceeds the combined local inventory allocation 414 plus buffer 406, and encroaches into the portion of the total inventory reserved for network allocation 402. In various embodiments, a traffic system generating broadcast logs based on variable allocation 400 can transmit a message to an external advertisement system responsible for scheduling network inventory, and requesting that the external advertisement system relinquish some of the network inventory for reallocation to local inventory broadcast. In some embodiments, rather than sending a request, which implies asking permission, a notification is sent, and the network inventory is pulled back.

In at least one embodiment, in response to the request or notification, the external advertising system replies to the request by transmitting network inventory information 123, which can be used to inform the traffic system of a network inventory status indicating how much of the requested inventory is unsold network inventory 408, how much of the requested inventory is actually sold network inventory 410. In at least one embodiment, the traffic system will pull back only unsold inventory, while in others even sold inventory will be pulled back. If sold inventory is pulled back, traffic system may attempt to place the pulled-back inventory using a bumped-spot replacement technique, subject to network inventory allocations at the time and location of attempted placement.

Figure 5:
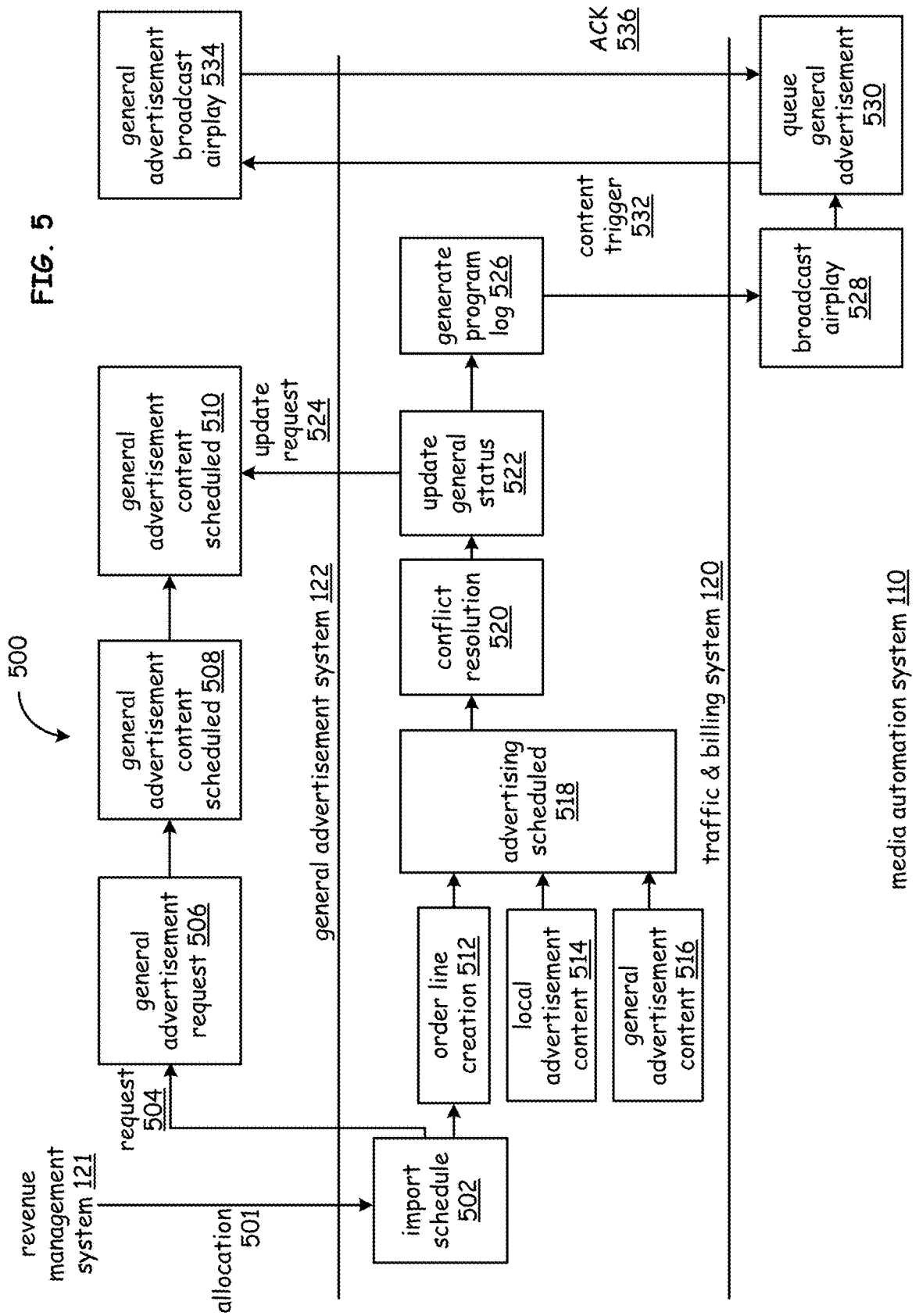
FIG. 5 is a block diagram of a process and communication structure between system components according to various embodiments of the present disclosure.

Referring next to FIG. 5, a process and communication structure 500 between system components according to various embodiments of the present disclosure will be discussed. The process and communication structure includes general advertisement system 122, traffic and billing system 120, and media automation system 110.

A revenue management system 12 provides an advertisement content allocation prediction 501, which the traffic and billing system 120 receives, and imports a chronological schedule 502. The allocation prediction 501 provides information for broadcast airplay that includes a local advertisement content allocation amount and a general advertisement content allocation amount. In the dynamic allocation contemplated, the local advertisement content allocation amount and the general advertisement content allocation amount are substantially complementary for a predetermined duration of the broadcast airplay. The chronological schedule 502 can provide a request 504 to the general advertisement system 122 and is also provided to an order line creator 512 of the traffic and billing system 512.

The general advertisement system receives the general advertisement request 506 and the general advertisement system 122 orders, retrieves and/or creates the general advertisement content for scheduling at 508 to produce the scheduled advertisement content as scheduled at 510.

The traffic and billing system 120 receives the chronological schedule from 502 and generates an order line creation at 512. The advertising for the local and the general advertisement content are populated in the scheduled at 518, with input from the order line creation 512, the local advertisement content 514, and the general advertisement content 516. For scheduling, the listing may include links to physically stored advertisement content of the general advertisement system 122, and the traffic and billing system 120, respectively.

The populated scheduling is reviewed by the traffic and billing system 120 for conflicts for the predetermined duration exceed the general advertisement content allocation among and conflicts with the general advertisement content in conflict resolution 520. When this occurs, the general advertisement content pulls back general advertisement content from the populated local advertisement spots to accommodate the local advertisement content in the advertisement spots. The general advertisement content is updated at updated general status 522 via an update request 524 listing the general advertisement content as being pulled-back. The general advertisement content being available once again for populating another remaining ones of the plurality of advertising spots, or subsequent advertisement spots.

Moreover, the traffic and billing system 120 may indicate determine whether the number of conflicts that occur in the local and general advertisement content scheduling for the predetermined duration exceed a conflict threshold. When the threshold is exceeded, the traffic and billing system 120 may adjust the advertisement content allocation prediction 501 for the local advertisement content allocation amount and the general advertisement content allocation amount to reduce the number exceeding the conflict thresholds, and to take advantage of an increasing trend in the amount of local advertisement content. Likewise, the allocation prediction 501 may be adjusted to take advantage of an increasing trend in the amount of general advertisement content.

The general advertisement system 122 receives the update request 524 sent by the traffic and billing system 120 to a general advertisement content source of the general advertisement system 122 to log the pulled back status of the general advertisement content. The update request 524 may also include a change request, which indicates an adjustment of the advertisement content allocation prediction 501 as related to the general advertisement content allocation amount.

Following resolution of any conflicts, and any adjustments to the allocation prediction 501, the traffic and billing system 120 generates a program 526, which is provided to the media automation system 110 for broadcast airplay at 528. When general advertisement content is detected in the program log of 526, the media automation system 110 queues the general advertisement content at 530. In the present example of FIG. 5, the program log 526 does not include the physical advertising content, but instead links indicating the location. The general advertisement content system 122 contains and coordinates the general advertisement content. the media automation system 110, via the queue, sends a content trigger 532 to the general advertisement system 122 to facilitate the broadcast airplay of the general advertisement content at 534. The content trigger 532 may include general advertisement content identifiers, and may be in the form of a code tone. Upon completion of the general advertisement content identified by the media automation system 110, the general advertisement system 122 provides an acknowledgement 536 to the media automation system 110.

The traffic and billing system 120 also attempts to provide released advertisement inventory to the general advertisement system 122. The system 120 can import data from a revenue management system 121. The system 120 operates to processes data to create orders and order-lines to correspond with general advertisement content inventory of the general advertisement system 122. In some embodiments, in request 504, the system 120 causes the general advertisement system 122 to (a) not update existing general advertisement content inventory, and to retrieve new offers of the advertisement content, in which existing advertisement content offers of future weeks are deactivated and new offers of future weeks are created by the general advertisement system 122 via the network 124 (see FIG. 1), (b) the system 122 creates a single offer based on passed in offer object in the request 504 body, and/or (c) obtains a status of the general advertising content inventory before attempting to expire, or allow to expire, the general advertisement spots. In some embodiments, changes from import schedule 502 will not cancel previously booked offers in the network. Instead, changes that reduce the network allocation will only be made (reduced) against inventory in the network system that have not been booked yet.

The general advertisement system 122 may then attempt to obtain the general advertisement content again, at the direction of the traffic and billing system 120, and the system 122 may continue to sell spots that are no longer 'excess' for the traffic and billing system 120. In the event that general advertisement content is unsold (and accordingly, the allocations amounts of the general advertisement allocation amount are consistently under-filled or unsold), when local advertisement content is available for population of the advertisement slots of the general advertisement allocation amount.

In an alternate embodiment, the traffic and billing system 120 attempts to expire all unsold general advertisement content spots for a predetermined number of days in the future (during the predetermined duration). For temporal reallocation, the system 120 indicates scheduling for the number of advertisement spots to be equal to the number of unsold advertisement spots in the local advertisement content allocation amount. In the event unsold spots are not able to be forced to expire, the general advertisement system 122 expects more general advertisement content spots for broadcast airplay, and may yet fill the advertisement spots with no-cost spots (public service announcements or block fill).

In at least some embodiments, if network inventory information 123 indicates inventory that remains unsold within a threshold time before a standard time-to-air, traffic and billing system 120 can reduce the portion of total inventory allocated to an external advertisement system, such as general advertisement system 122. In some embodiments, the reduced allocation is allocated to local inventory, removed from inventory and re-designated for programming. The threshold time can be, for example, within 1 week of scheduled air time.

Figure 6:
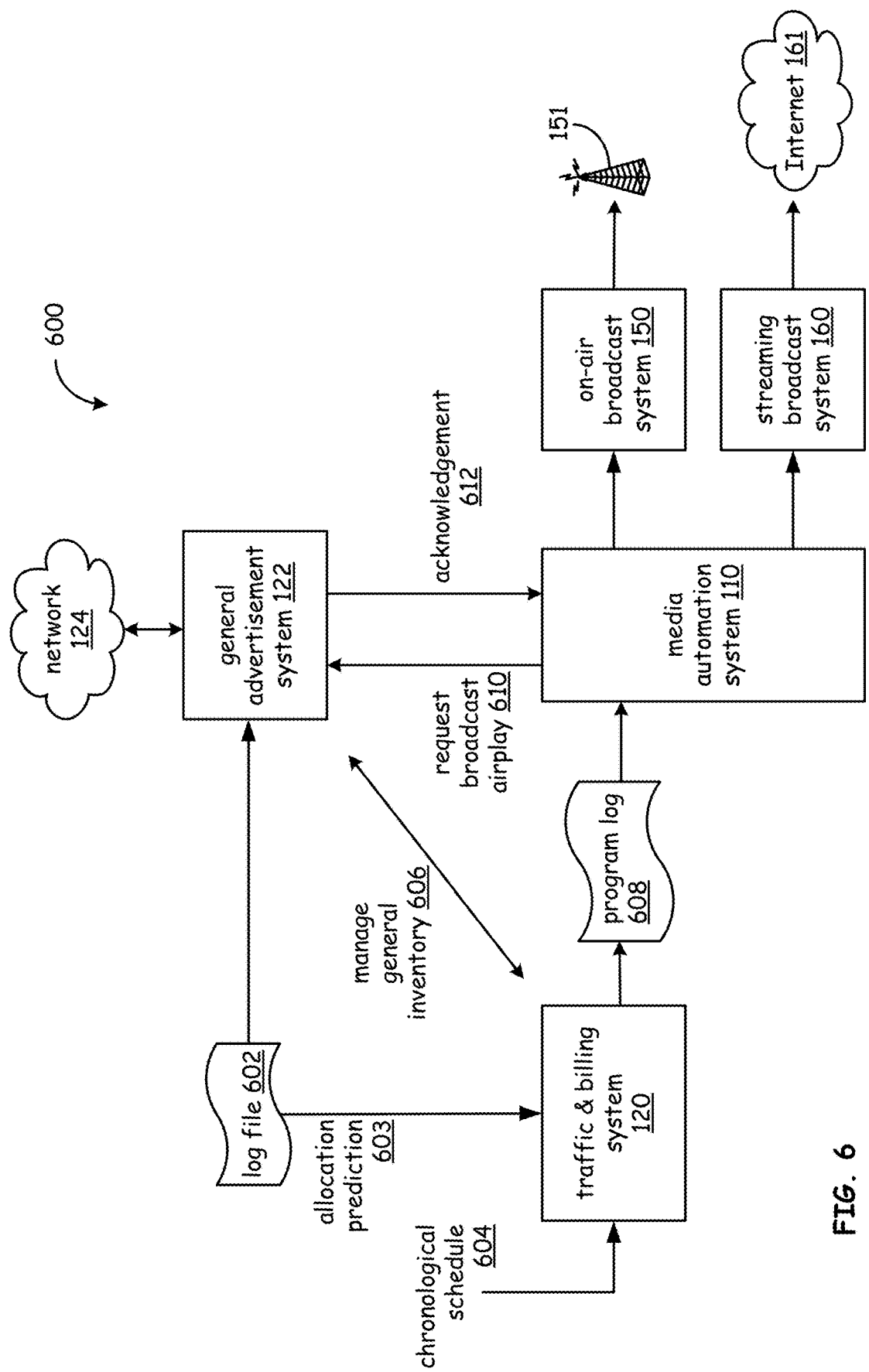
FIG. 6 is a block diagram of a dynamic allocation system 600 according to various embodiments of the present disclosure.

Referring next to FIG. 6, a dynamic allocation system 600 according to various embodiments of the present disclosure will be discussed. The dynamic allocation system 600 includes a traffic and billing system 120, a general advertisement system 122 and a media automation system 110.

The traffic and billing system 120 operates to receive a log file 602, which may be generated by a revenue management system. The log file 602 includes advertising revenue information, such as allocation prediction 603 for broadcast airplay. The prediction 603 includes a local advertisement content allocation amount and a general advertisement content allocation amount. In the dynamic allocation system 600, the local advertisement content allocation amount and the general advertisement content allocation amount are substantially complementary to allocate the entire advertising allocations for a predetermined duration of the broadcast airplay. For example, the local advertisement content allocation amount may be about eight-percent, and the general advertisement content allocation amount is a about twenty-percent, in complementary fashion.

With the allocation prediction 603 for a predetermined duration, the traffic and billing system 120 imports a chronological schedule 604 that designates a plurality of media content spots and a plurality of advertising spots for the predetermined duration. With this information, the traffic and billing system 120 populates local advertising spot allocation of the chronological schedule by populating, or scheduling with a local advertisement content listing to produce populated local advertising spots. The traffic and billing system 120 populates the general advertising spot allocation of the chronological schedule 604 by sending a request to the general advertisement system 122 via the manage general inventory communication link 606. The general advertisement system 122 also received the log file 602, and is able to access the network 124 to retrieve the general advertising content to satisfy the log file 602 and the chronological schedule 604, when sufficient "sold" quantities of general advertisement content are present.

The traffic and billing system 120 populates remaining ones of the advertising spots with general advertisement content available from a general advertisement content listing according to the chronological schedule 604.

Upon populating the chronological schedule, the traffic and billing system 120 generates a program log 608, which is provided to the media automation system 110 for broadcast via the on-air broadcast system 150, and/or the streaming broadcast system 160, as directed.

As general advertisement content is scheduled for broadcast airplay, the media automation system 110 provides a request 610 to the general advertisement system 122, which conducts the airplay of the content as locally stored or otherwise accessed remotely through the network 124. Upon completion of the airplay, the general advertisement system 122 provides an acknowledgement 612 to the media automation system 110.

In the event a conflict arises between local media content and the general media content in the allocation prediction, and associated allocation amounts, the dynamic allocation system 600 operates to resolve the conflict.

For example, when the populated local advertisement spots for the predetermined duration exceeds the general advertisement content allocation amount and conflicts with the general advertisement content, the general advertisement content is pulled back from the populated local advertisement spots to accommodate the local advertisement content in the advertisement spots. The general advertisement content listing is updated at the traffic and billing system 120, and sends an update request over the manage general inventory 606 to the general advertisement system 122. The system 122 logs the pulled back status of the identified general advertisement content, which may be available for subsequent populating the remaining advertising spots with general advertisement content at a later point.

In this manner, as contrasted to a conservative straight-line allocation prediction, the dynamic allocation system 600 may take advantage of maximizing advertisement revenue by accommodating broadcast airplay of otherwise conflicting advertisement content between the general and the local mediums. Accordingly, greater revenue may be realized by the automatic conflict resolution and foregoing a giving revenue loss in avoiding conflicts, which had previously been unresolvable, and accepting the advertising revenue loss due to a conflict buffer 206 (see, for example, FIG. 2).

Figure 7:
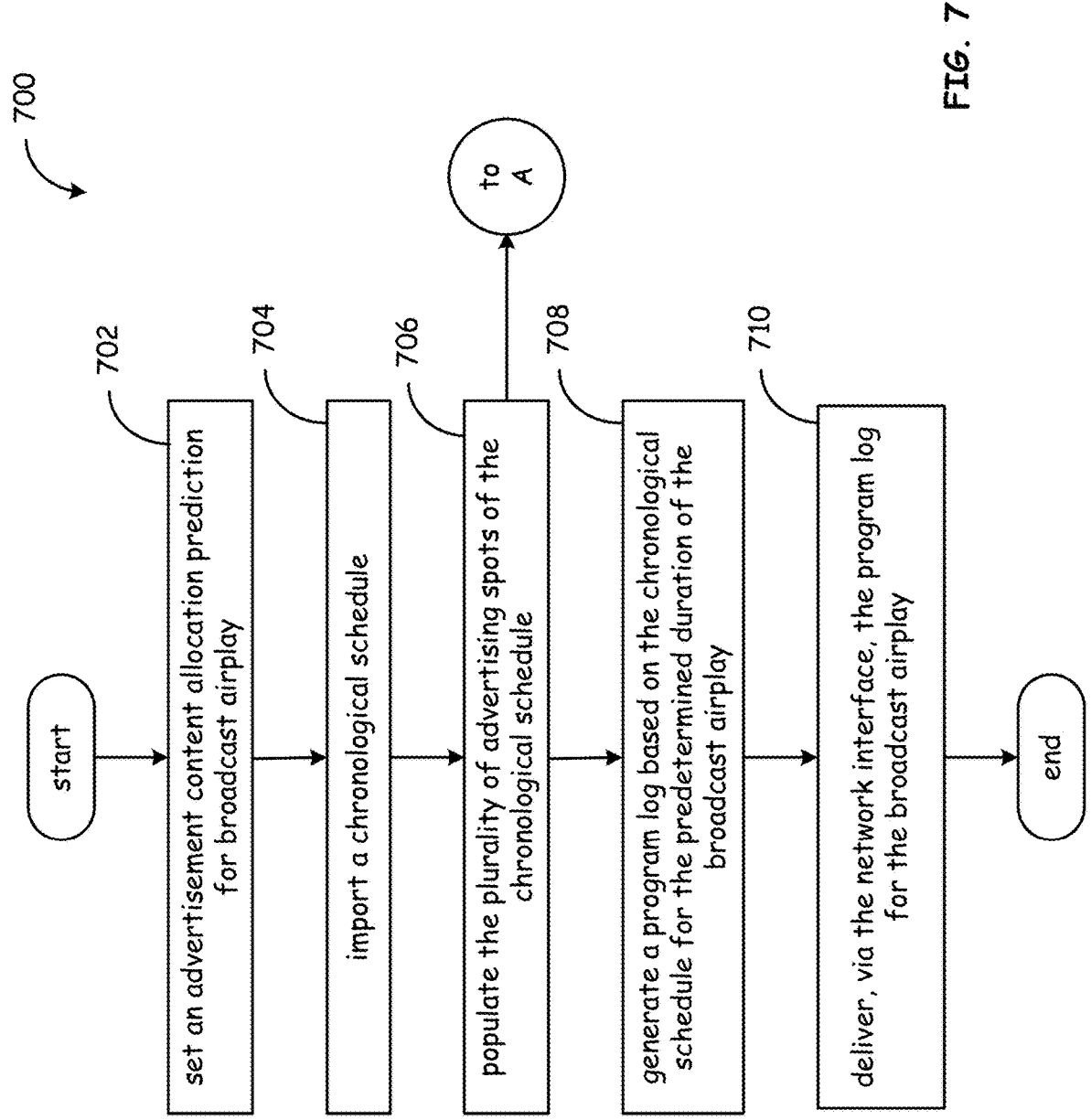
FIG. 7 is a flow chart of a method for use in a content broadcast system according to various embodiments of the present disclosure.

Referring to FIG. 7, a method 700 for use in a content broadcast system according to various embodiments of the present disclosure will be discussed. Starting at block 702, an advertisement content allocation prediction for broadcast airplay is set. The allocation prediction includes a local advertisement content allocation amount and a general advertisement content allocation amount, which are substantially complementary for a predetermined duration of the broadcast airplay.

Next, at block 704, a chronological schedule is imported by the system. The chronological schedule designates a plurality of media content spots and a plurality of advertising spots for the predetermined duration. With the chronological schedule and the allocation prediction, the system populates the plurality of advertising spots at block 706, which is discussed in further detail with reference to FIG. 8.

The system then generates a program log at block 708 based on the chronological schedule for the predetermined duration of the broadcast airplay. The program log indicates a populated plurality of advertisement spots in the broadcast airplay. The system then delivers at block 710, via a network interface, the program log for the broadcast airplay.

Figure 8:
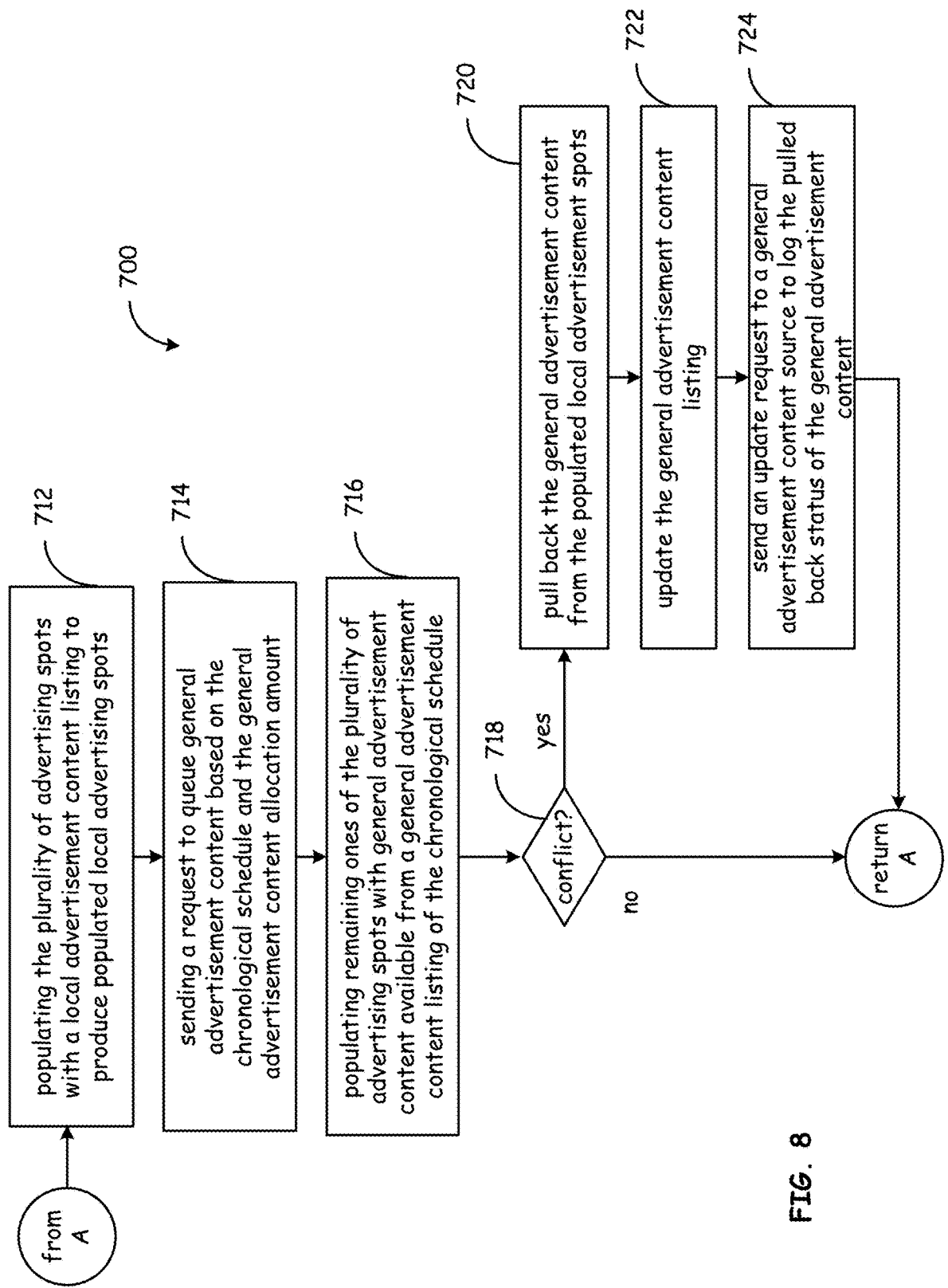
FIG. 8 is another flow chart of a method for use in a content broadcast system according to various embodiments of the present disclosure.

Referring to FIG. 8, the method 700 for use in a content broadcast system according to various embodiments of the present disclosure will be further discussed. As shown, with populating the advertising spots, the system at 712 populates advertising spots with a local advertisement content listing to produce populated local advertising spots as directed by the chronological schedule and based on the allocation prediction. With respect to general advertisement content, the system sends a request, via the network interface, at block 714 to queue general advertisement content based on the chronological schedule and the general advertisement content allocation amount. Then, at block 716, the system populates remaining ones of the advertising spots with general advertisement content available from a general advertisement content listing of the chronological schedule. The population of the advertisement spots may be the physical content, links, or identifiers sufficient to enable broadcast airplay of the advertisement content.

When the populated local advertisement spots for the predetermined duration exceed the general advertisement content allocation amount and conflicts with the general advertisement content at block 718, the system operates at block 720 to pull back the general advertisement content from the populated local advertisement spots to accommodate the local advertisement content in the plurality of advertisement spots. The system at block 722 updates the general advertisement content listing to reflect a pulled back status of the general advertisement content. In doing so, the general advertisement content that had been pulled back is again available for populating another remaining ones of the advertising spots. Then, at block 724, the system sends an update request, via the network interface, to a general advertisement content source to log the pulled back status of the general advertisement content. Again, the update indicates that the general advertisement content is again available for subsequent populating the remaining ones of the advertising spots with the general advertisement content. The populating of the advertising spots then returns to the flow at FIG. 7 after resolving the conflict at 718, or when no conflict occurs between the scheduling of the local advertisement content and the general advertisement content.

Also, in the event the number of scheduling conflicts duration exceed the general advertisement content allocation amount beyond a conflict threshold, the system may operate to adjust the advertisement content allocation prediction to mitigate the number of conflicts. In this manner, the system operates to adjust the advertisement content allocation prediction for the local advertisement content allocation amount and the general advertisement content allocation amount to reduce the number exceeding the conflict threshold. Upon adjusting the content allocations, the system sends a change request, via the network interface, indicating the adjustment of the advertisement content allocation prediction for at least the general advertisement content allocation amount.

Also, when there are unfilled blocks or unsold space in the local advertisement allocation amount, the system may reallocate the space for scheduling of general advertisement content. That is, when the populated local advertisement spots for the predetermined duration do not exceed the general advertisement content amount, populate the remaining ones of the plurality of advertisement spots with the general advertisement content available from the general advertisement content listing.

Figure 9:
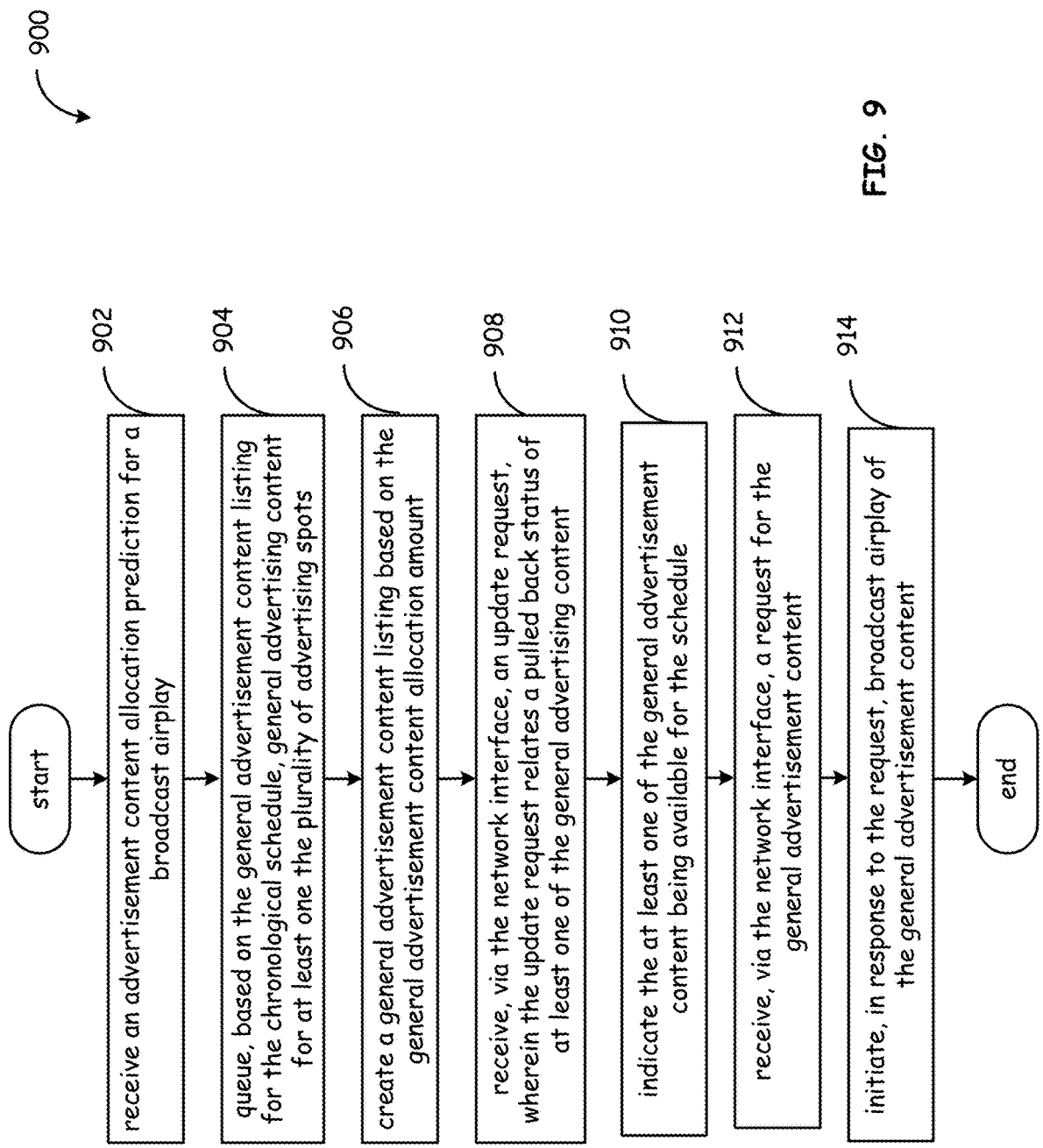
FIG. 9 is a flow chart for providing general advertisement content in a content broadcast system according to various embodiments of the present disclosure.

Referring to FIG. 9, a method 900 for providing general advertisement content in a content broadcast system according to various embodiments of the present disclosure will be discussed. As noted, the system provides allocations from the perspective of the general advertisement system 122 (see, for example, FIGS. 1-5).

At block 902, the system imports a chronological schedule, which designates a plurality of media content spots and advertising spots for a predetermined duration and based on an advertisement content allocation prediction. The chronological schedule can include a local advertisement content listing and a general advertisement content listing. The system, at block 904, queues, based on the general advertisement content listing for the chronological schedule, general advertising content for at least one the advertising spots. The system at block 806 creates a general advertisement content listing based on the general advertisement content allocation amount. Then at block 908, the system receives, via the network interface, an update request. The update request can include a request for updated network inventory status, including a request to determine whether least one of the general advertising content can be pulled back by the traffic system for inventory reallocation. As illustrated at block 810, the external advertising system can reply to the update request by replying to the traffic system with a message indicating that at least one of the general advertisement content is available for broadcast, or alternatively that the at least one of the general advertisement content should not be pulled back. The system receives at block 912, via the network interface, a request for the general advertisement content, and at block 914 initiates, in response to the request, broadcast airplay of the general advertisement content.

Figure 10:
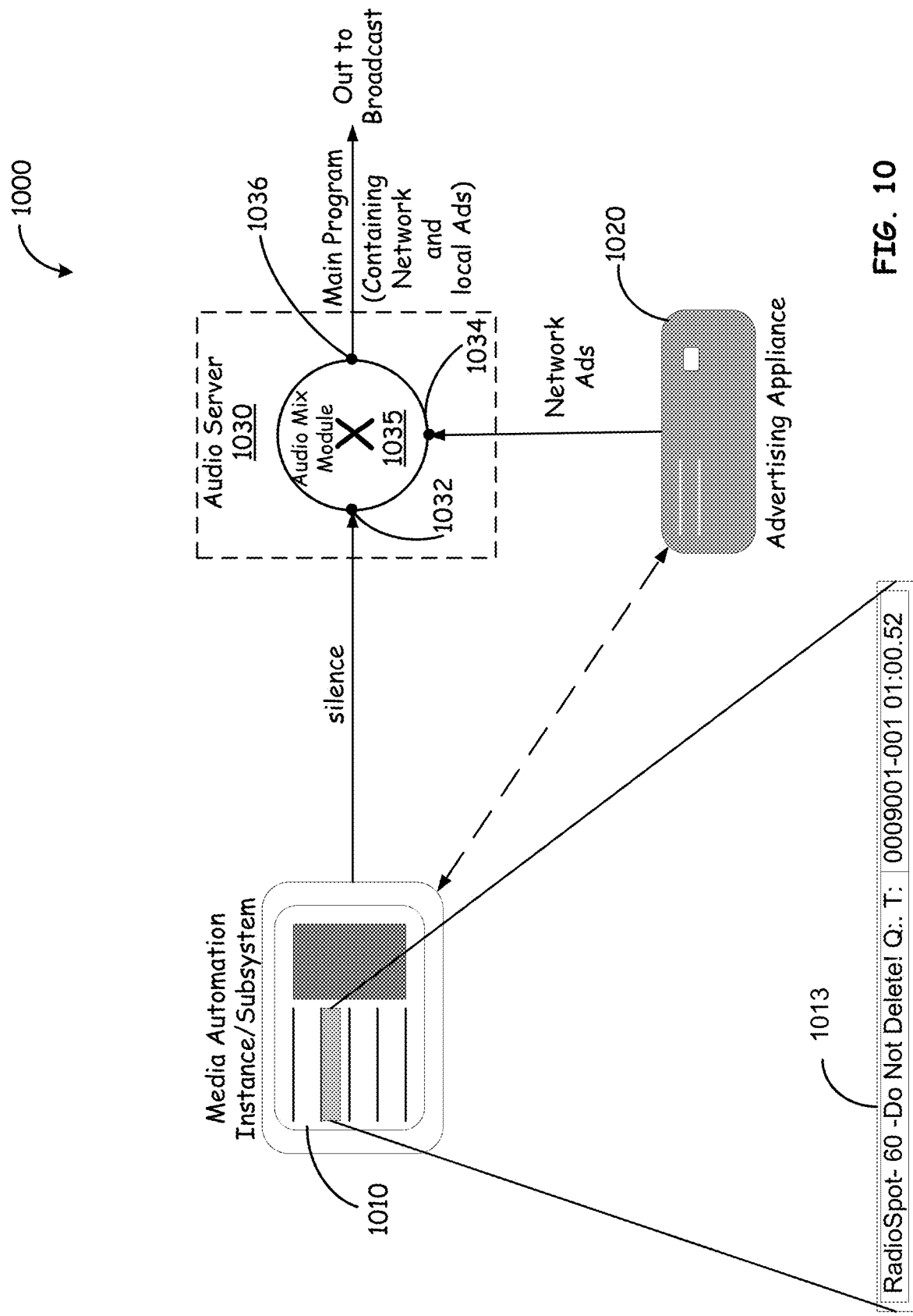
FIG. 10 is a block diagram illustrating playout of local and network inventory by a system including an instance or subsystem of a media automation system collocated with an advertisement appliance, according to various embodiments of the present disclosure.

Referring next to FIG. 10, playout of local and network inventory by a system 1000 including an instance or subsystem of a media automation system collocated with an advertisement appliance, will be discussed according to various embodiments of the present disclosure. System 1000 includes a media automation instance/subsystem 1010, advertising appliance 1020, and audio server 1030. Media automation instance/subsystem 1010 plays-out media content as instructed by a broadcast log. The broadcast log can include programming content, local spots associated with local inventory, and one or more placeholder entries, such as placeholder entry 1013 representing a "spot" for network inventory. In at least one embodiment, placeholder entry 1013 indicates an allotted time assigned to advertising appliance 1020 for play-out of the external inventory.

Media automation instance/subsystem 1010 plays out content to audio server 1030, until media automation instance/subsystem 1010 encounters placeholder entry 1013. Upon encountering placeholder entry 1013, media automation instance/subsystem 1010 temporarily stops playing out local content and programming, for example by playing-out silence, and sends a notification, for example a transmission control protocol (TCP) trigger signal, to advertisement appliance 1020. In various embodiments, advertisement appliance 1020 responds to the receipt of the trigger signal or other notification by beginning play-out of network inventory to audio server 1030. In some embodiments, advertisement appliance 1020 can also send an acknowledgement signal within approximately 200 ms, thereby confirming receipt of the trigger signal. Audio server 1030 plays out received media into a main program, which is in turn transmitted to a station's broadcast equipment for broadcast transmission.

In at least one embodiment, audio server 1030, includes audio mix module 1035, which can combine media being played-out by media automation instance/subsystem 1010 and advertising appliance 1020. Audio mix module 1035 can be used in some embodiments to select between media automation system input 1032 and external advertisement input 1034, and connect the selected input to main program output 1036. Media automation system input 1032 and external advertisement input 1034 can be physically separate inputs, or logical inputs implemented using a common physical communications interface.

In other embodiments, instead of selecting between inputs, audio mix module 1035 can combine the inputs from media automation system input 1032 and external advertisement input 1034 so that media received on both inputs are mixed together into a single output. In this way audio server can process received signals to implement various fade-ins and fade-outs, or otherwise manipulate the received media content in tandem to produce a more seamless transition between local inventory play out by media automation system input 1032 and network inventory playout by advertising appliance 1020.

Figure 11:
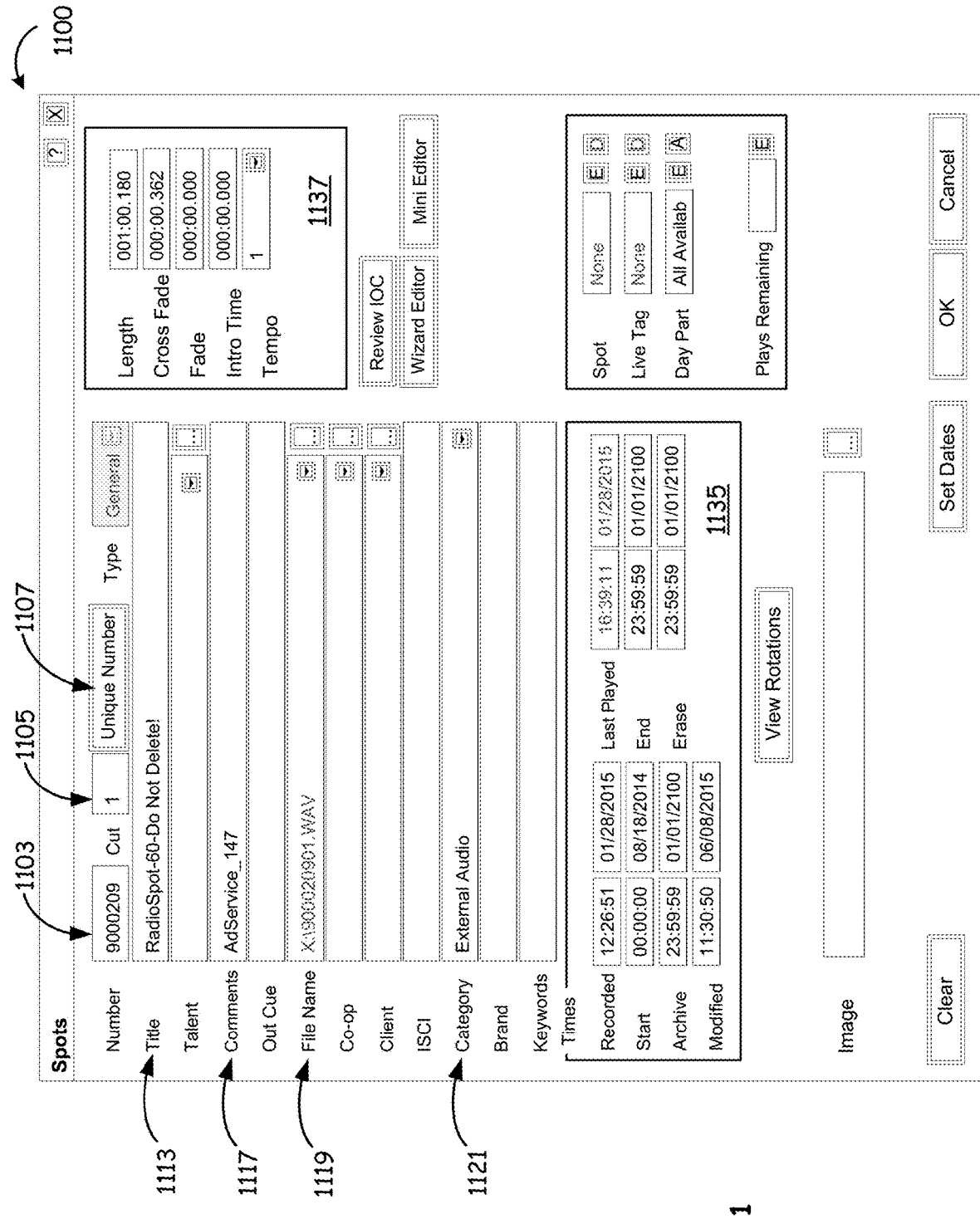
FIG. 11 is a diagram illustrating a Spot-Information interface displaying information about dead-roll, or placeholder, cart according to various embodiments of the present disclosure.

Referring next to FIG. 11, a Spot-Information interface (SI interface) 1100 displaying information about dead-roll, or placeholder, cart will be discussed according to various embodiments of the present disclosure. SI interface 1100 can include multiple display areas arranged and configured to organize information related to spots included in a broadcast schedule, including spots allocated to local inventory to be played out by one media system and spots allocated to network inventory to be played out by a second media system. In the illustrated embodiment, SI interface 1100 includes number field 1103 that can be used to display a cart identifier associated with the spot being viewed, where the term cart refers to a file to be played-out during the spot in question; a cut field 1105 that can be used as a version control to identify different instances of a cart; an identifier type field 1107 which can be used to identify the type of identifier displayed in number field 1103, for example whether the identifier is a unique identifier, as illustrated, is an identifier provided by an external source, or otherwise; a title field 1113 used to indicate a title of the cart; a comments field 1117; a file name field 1119 used to display a file name and path of the cart; a category field 1121 used to indicate a cart type; a time area 1135 used to display various historical, time-related information about the cart; a characteristics area 1137 used to display content characteristics associated with the spot being viewed; and various other metadata, scheduling, content, and other information associated with the spot being viewed.

In at least one embodiment, the contents of category field 1121 can be used to notify media automation instance/subsystem 1010 that a request, trigger message, TCP call, or similar signal is to be transmitted to advertising appliance 1020. In some embodiments, a special value of category field 1121 can be mapped to a specific, centrally managed set of carts that are coded with TCP messages to be sent to advertisement appliance via an Ethernet or other communication network. For example, the spot displayed by SI interface 1100 is assigned cart number 9000209, cut 1, which is an external audio cart. In at least one embodiment the category of "external audio" can be used to indicate that the spot being viewed is reserved for broadcast of network inventory to be provided by an external advertisement system. The file associated with cart number 9000209 can be found at X:\900020901.wav. In some embodiments, during the time that the external advertisement system is playing out network inventory for broadcast, the media automation system can play out the file X:\900020901.wav, which results in media automation system playing out silence, rather than playing out local inventory. Note at dead rolls are not considered local inventory for purposes of at least one embodiment of the present disclosure.

Figure 12:
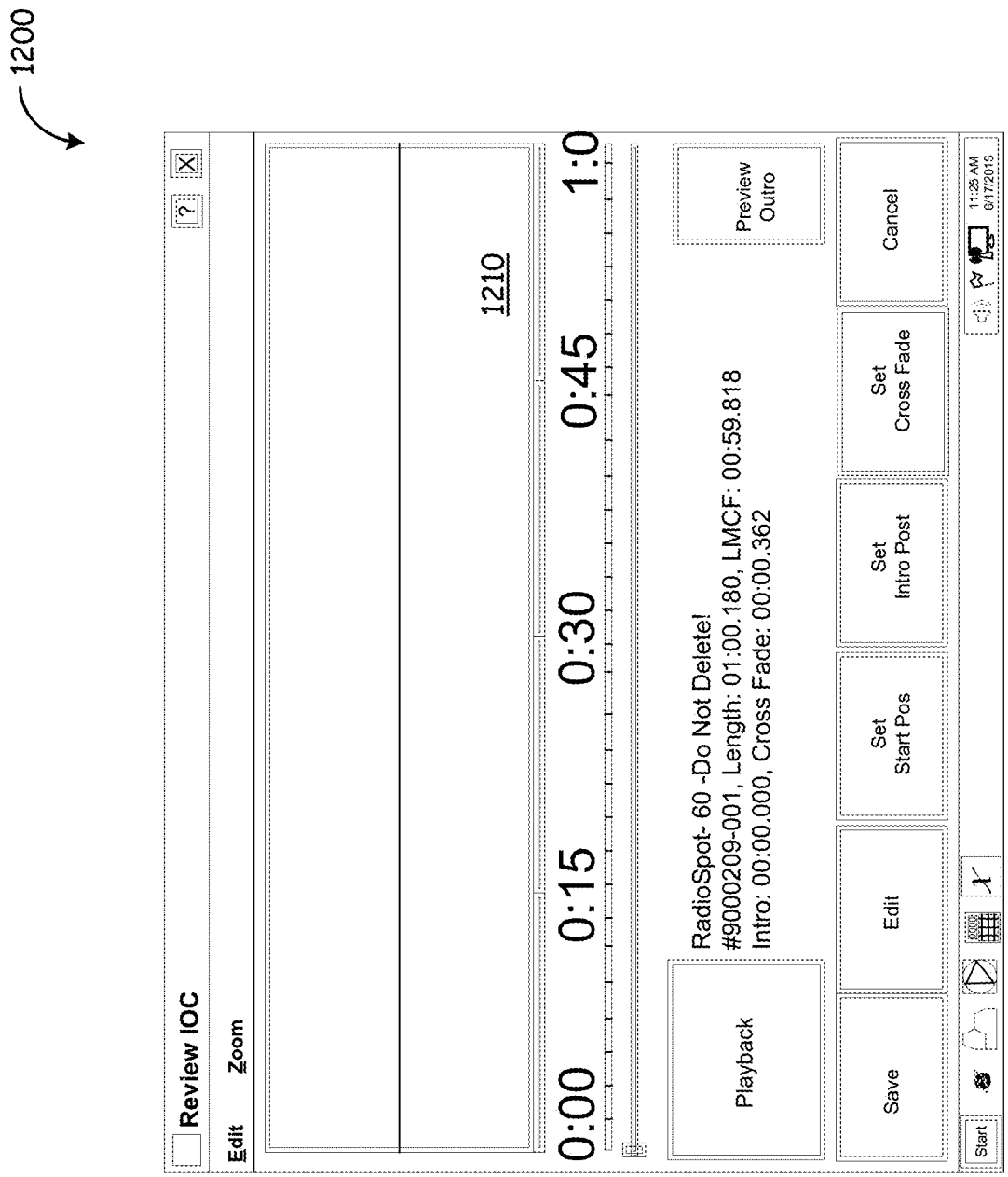
FIG. 12 is a diagram illustrating an Audio-Content interface including an audio graph of a dead-roll cart according to various embodiments of the present disclosure.

Referring next to FIG. 12, an Audio-Content interface (AC interface) 1200 including an audio graph of a dead-roll cart, will be discussed according to various embodiments of the present disclosure. AC interface 1200 is populated with information from the same spot, discussed above with reference to FIG. 11. AC interface 1200 includes graph region 1210, which is used to display a graph of the audio content of cart number 9000209, and multiple user selectable objects that can be used for editing, playing back, and previewing the contents of cart number 9000209. As illustrated by graph region 1210, there is no audio content included in cart number 9000209. Phrased another way, the audio content of cart number 9000209 is "silence." A cart with no audio content/silence is sometimes referred to as a dead roll, because playing out a cart with no audio content results in "dead air," or silence.

In some embodiments, upon encountering, beginning playout, or preparing to begin playout of a dead roll or other cart associated with a spot designated for broadcast of network inventory, the media automation system playing out the dead roll or other cart can transmit a triggering message to a network advertising system to notify the network advertising system that playout of network inventory should commence. In at least one such embodiment, the network advertising system has been previously made aware of the length of time allotted for playout of network content, and the network advertising system is expected to play out network inventory or other content sufficient to fill the allotted time.

There can, however, be circumstances under which the network advertising system does not fill the allotted time. For example, an advertising appliance used by the network advertising system could malfunction. In other circumstances, the network advertising system may be willing to relinquish a portion of its allotted time, because the network advertising system does not have a full complement of sold network inventory for broadcast. To facilitate the return of previously allotted time, a network advertising system can notify a media automation system that some or all of the time previously allotted for broadcast of network inventory can be used for broadcast of local inventory. In some embodiments, this notification can take the form of an early return message.

Figure 13:
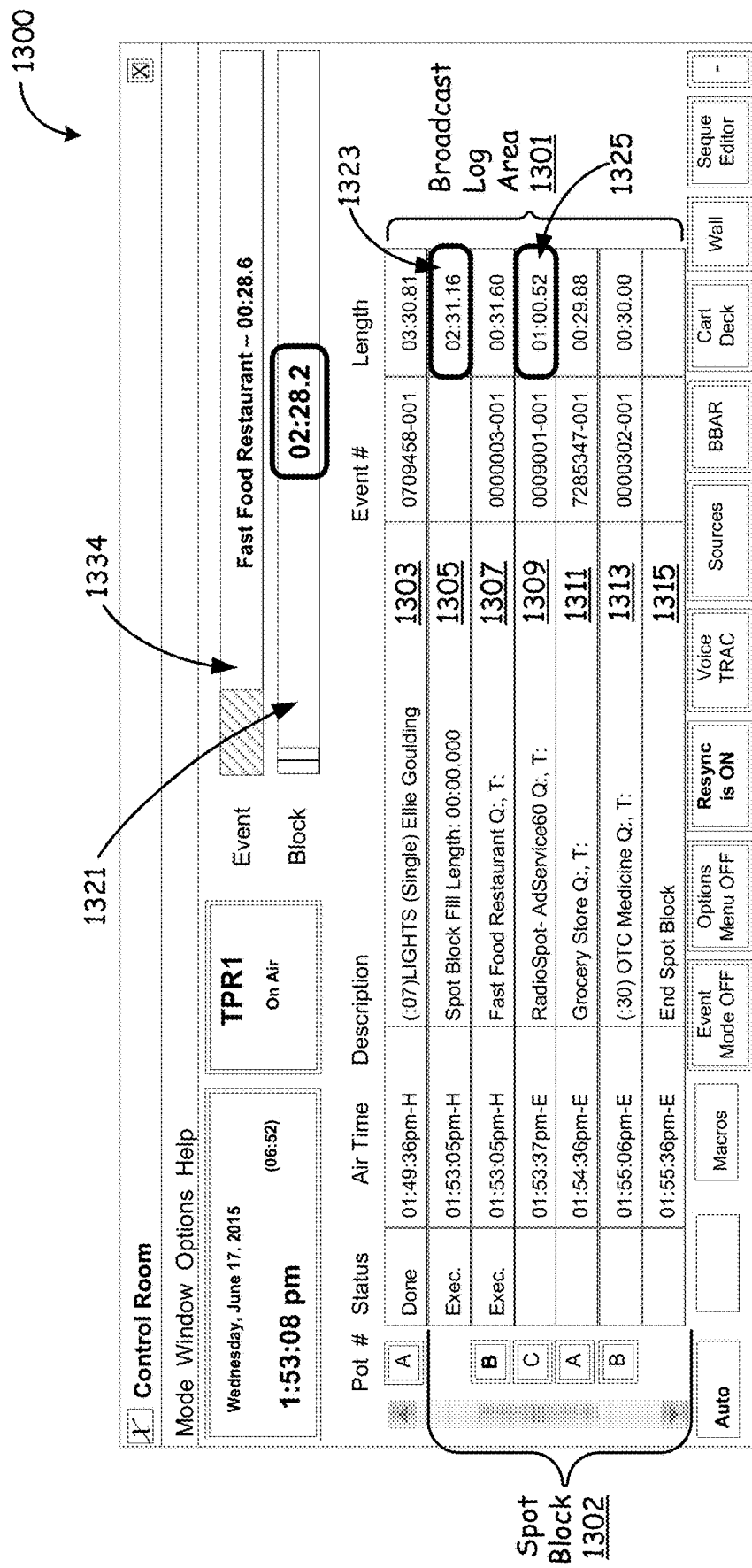
FIGS. 13-15 are diagrams illustrating a control-room interface illustrating play-out and early-return of network inventory based on a broadcast log, according to various embodiments of the present disclosure.
Figure 14:
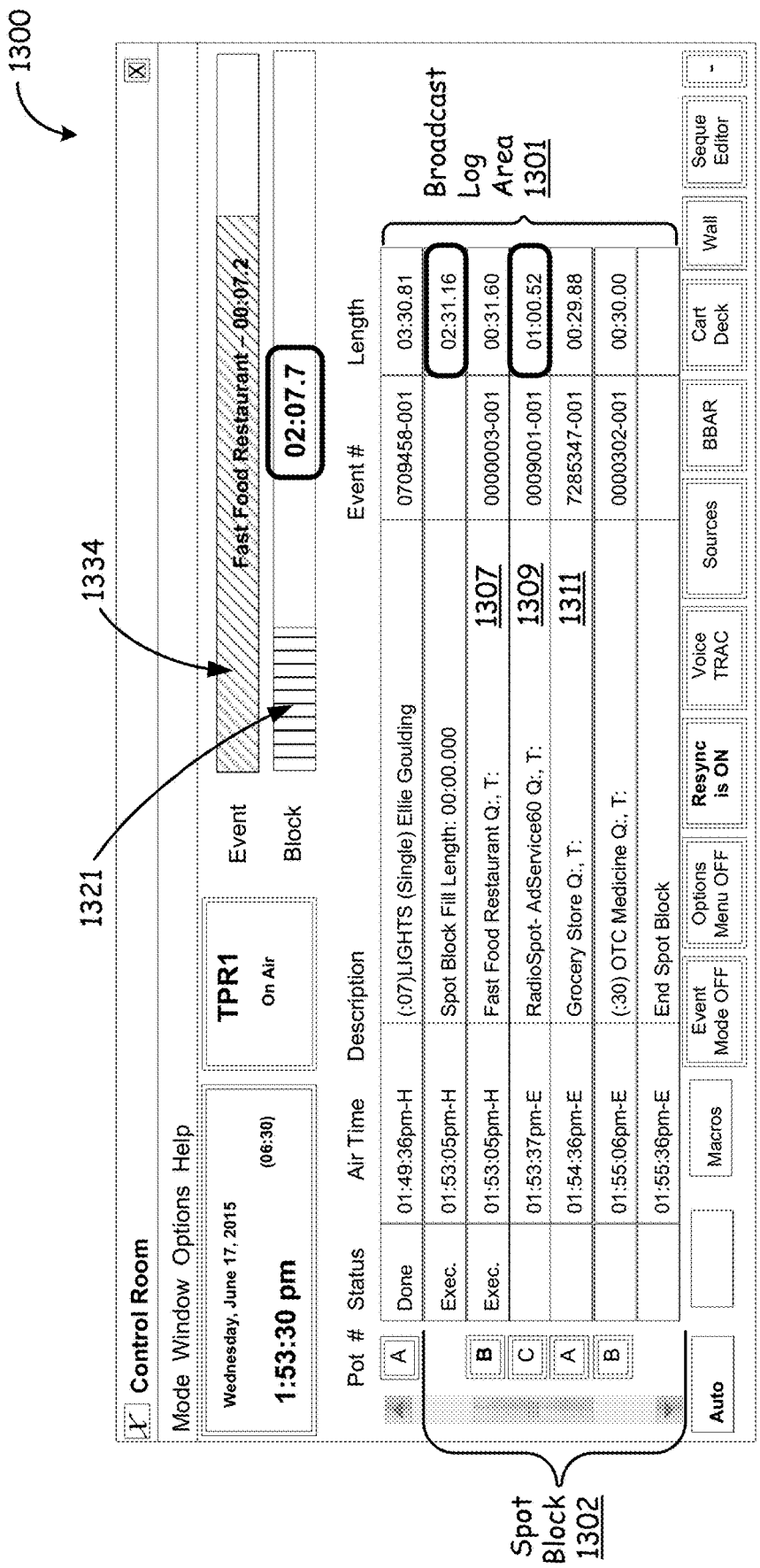
Figure 15:
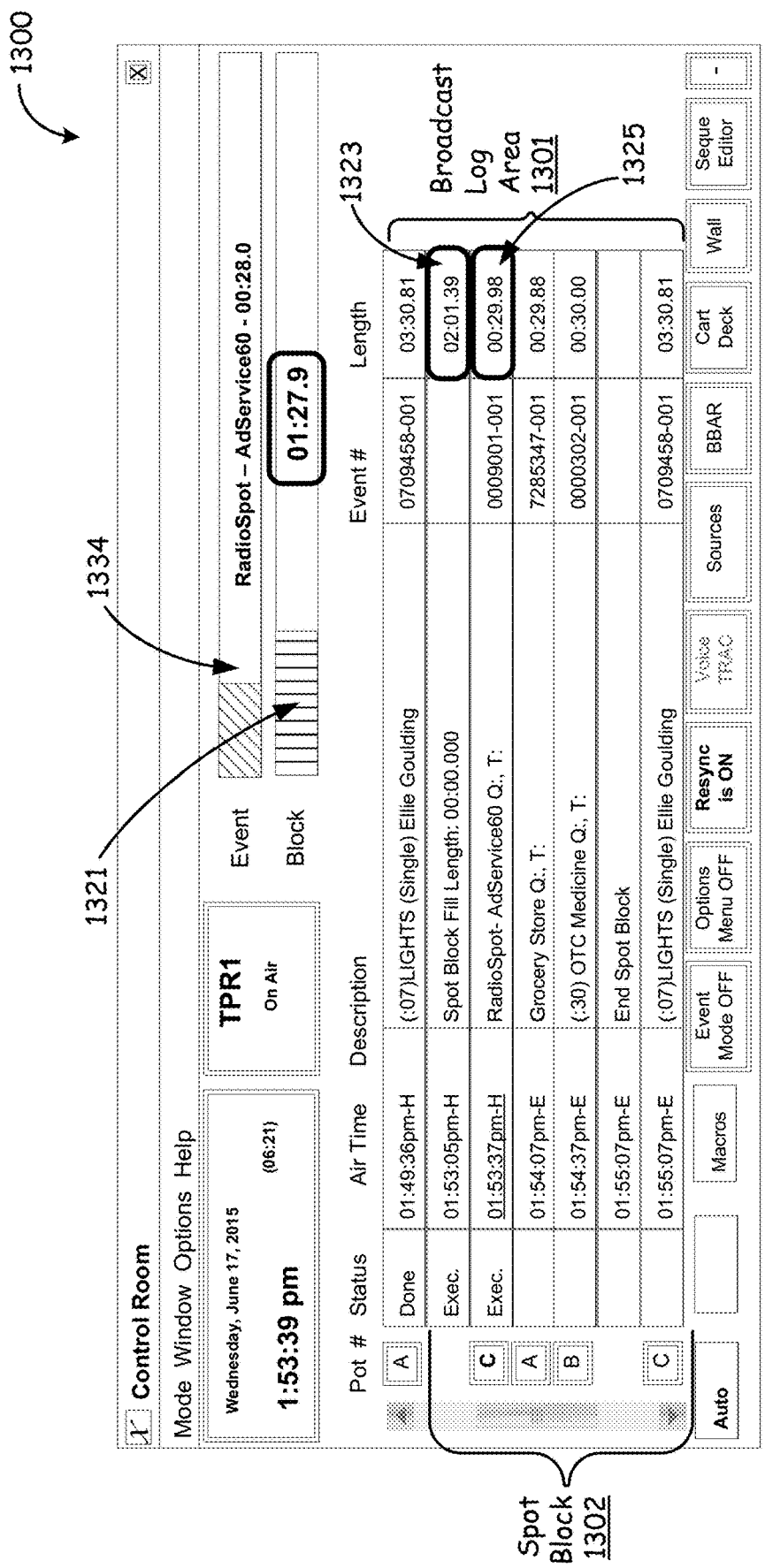

Referring next to FIGS. 13-15, a control-room interface 1300 used to illustrate play-out and early-return of network inventory based on a broadcast log, will be discussed according to various embodiments of the present disclosure. Control room interface 1300 includes a log display area 1301 displaying status, air time, description, event, and length information for broadcast log entries 1303, 1305, 1307, 1309, 1311, 1313, and 1315; event timer 1334; block timer 1321, and various additional control and informational objects as illustrated in FIG. 13.

FIG. 13 shows a snapshot of control room interface 1300 at a first time during playout of spot block 1302. The spot block length 1323 in the illustrated embodiment is 2 minutes and 31.16 seconds. At the time illustrated in FIG. 13, event timer 1334 indicates that the Fast Food Restaurant spot 1307 is currently playing, and has 0 minutes and 28.6 seconds remaining to completion. Block timer 1321 indicates that spot block 1302 has 2 minutes and 28.2 seconds remaining to be played out.

Note that Radio Spot-AdService spot 1309 has a spot length 1325 of 1 minute and 0.52 seconds, and is scheduled to air immediately following completion of Fast Food Restaurant spot 1307. In the illustrated embodiment, Radio Spot-AdService spot 1309 is a placeholder entry indicating that an external advertisement system has been allotted 1 minute and 0.52 seconds for broadcast of network advertising content.

FIG. 14 shows a snapshot of control room interface 1300 at a second time during playout of spot block 1302. At the time illustrated in FIG. 14, event timer 1334 indicates that the Fast Food Restaurant spot 1307 is still playing, and has 0 minutes and 7.2 seconds remaining to completion. Block timer 1321 indicates that spot block 1302 has 2 minutes and 7.7 seconds remaining to be played out.

In various implementations, the media automation system will continue playing out spot block 1302 as indicated by the broadcast log shown in broadcast log area 1301, unless the media automation system receives information indicating that changes are to be made to the broadcast log. In at least one embodiment, when it is time to play-out Radio Spot-AdService spot 1309, the media automation system will transmit a trigger signal to an external advertisement system, notifying the external advertisement system that playout of network inventory should commence. The external advertisement system will play out network inventory for the allotted time of 1 minute and 0.52 seconds, during which time the media automation system will play out silence or otherwise pause playout of local inventory. After 1 minute and 0.52 seconds have elapsed, media automation system will resume playout of local inventory, in accordance with the broadcast log, by playing out grocery store spot 1311.

However, at least some embodiments permit an early return from playout of network inventory by the external advertisement system. For example, an external advertisement system can notify the media automation system, shortly before the time designated for broadcast of Radio Spot-AdService spot 1309, that the full 1 minute and 0.52 seconds of time allotted for use by the external advertisement system is not needed, and can be returned to the media automation system. The notification can, be received after spot block 1302 has begun playing, but before Radio Spot-AdService spot 1309 has begun; after a final version of the broadcast log has been provided to the media automation system, but before spot block 1302 has begun playing; and in some instances, even after Radio Spot-AdService spot 1309 has begun playing.

FIG. 15 shows a snapshot of control room interface 1300 at a third time during playout of spot block 1302. It is assumed, for purposes of this example, that just prior to the time designated for Radio Spot-AdService spot 1309 to be broadcast, the external advertisement service delivered to the media automation system an early return message or other notification indicating that the external advertisement service would be using only 30 seconds of the time allocated for Radio Spot-AdService spot 1309, and that the remaining 30.52 seconds allocated to Radio Spot-AdService spot 1309 will be returned for use by the media automation system.

In response to the early return notification, media automation can change the cue point of a local spot or other content scheduled to follow Radio Spot-AdService spot 1309, and shorten the lengths of both spot block length 1323 and spot length 1325 to reflect the 30 second change. Thus, for example, media automation system alters the broadcast log so that spot block length 1323 is reduced from 2 minutes and 31.16 seconds to 2 minutes and 1.39 seconds; and spot length 1325, which indicates the length of Radio Spot-AdService spot 1309 is reduced from 1 minute and 0.52 seconds to 0 minutes and 29.98 seconds. As a result, at the time illustrated in FIG. 15, event timer 1334 will display a remaining time of 0 minutes and 28.0 seconds, and block timer 1321 will display 1 minute and 27.9 seconds to show the time remaining until spot block 1302 is to be completed.

In the illustrated embodiment, these changes effectively shift the scheduled cue times of following items forward by 30 seconds. In some embodiments, however, given sufficient notice from the external advertisement service, the recovered 30 seconds can be immediately reassigned for broadcast of local inventory, local fill, programming, or other media items.

In some embodiments, an early return from playout of network inventory can trigger a bumped-spot process, in which the media automation system notifies a traffic and billing system of the newly available inventory, and the traffic and billing system selects appropriate local inventory or other content to be inserted into the schedule.

In some embodiments, an early return indication need not be transmitted by the external advertisement system, but instead can include a failure to receive an expected communication from an appliance associated with the external advertisement system. Thus, for example, if a communications link between a media automation system and a network advertisement appliance associated with an external advertisement network is served, for example by loss of wireless or wired communication, the external advertisement system would be unable to either receive trigger notifications, provide messages acknowledging receipt of the trigger notifications, or both. Thus, if two-way communication between a media automation system and an external advertisement network is lost, the media automation system would not receive an expected message from the external advertisement system, and could treat this failure to receive an expected message as if an early return notification had been received.

In various embodiments, network inventory information can be transmitted from a network advertisement appliance to a media automation system, and decisions regarding early return can be made by the media automation system based on the inventory information. Thus, in some embodiments, early return can be implemented as an all-or-nothing process. An all-or-nothing early return process can be used to completely skip dead roll carts if the external advertisement system cannot provide content for the entire allocated time, but otherwise disable partial early returns.

In other embodiments, partial early returns can be "forced" by the media automation system for any or all unsold network inventory. So, for example, if the external advertisement system provides information indicating that 70% of its allocated network inventory has been sold, then the media automation system can force an early return of the 30% unsold inventory. These types of embodiments can be referred to as "early-return on fill," because early return is implemented only in the case where the external advertisement system is playing out fill content instead of paid network spots. In yet other embodiments, early return is executed in response to approval from the external advertisement system, regardless of whether the network advertisement system has unsold inventory or not.

Various disclosed embodiments can be implemented in hardware, software, or a combination containing both hardware and software elements. In one or more embodiments, the method is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, other suitable instruction execution system.

For the purposes of this description, a computer-usable or computer readable medium can be any apparatus that can contain, store, communicate, or transport the program for use by or in connection with an instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by a computer. Various embodiments of a computer readable medium specifically exclude non-transitory signals.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" may be used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

Various embodiments have been described for local and general advertisement content in schedules, which may be reallocated to resolve scheduling conflicts, or otherwise increase realized advertisement content and related increase in revenue. Other variations and modifications of the embodiments disclosed may be made based on the description provided, without departing from the scope of the invention as set forth in the following.

What is claimed is:
1. A method comprising:
receiving, at a processing device:
a log file including prediction information specifying a local advertisement content allocation amount and a general advertisement content allocation amount over a predetermined duration of time;
a chronological schedule designating a plurality of media content spots and a plurality of advertising spots for the predetermined duration of time;
determining, at the processing device, that a sold amount of local advertisement content during a particular time period is insufficient to fill the local advertisement content allocation amount specified by the prediction information during the particular time period, wherein the particular time period is less than the predetermined duration of time;
reallocating, at the processing device, a portion of the local advertisement content allocation amount to the general advertisement content allocation amount for the particular time period, while leaving the local advertisement content allocation amount and the general advertisement content allocation amount unchanged over the predetermined duration of time; and
generating, at the processing device, a program log in accordance with the prediction information and the reallocating.

2. The method of claim 1, wherein:
a sum of the local advertisement content allocation and the general advertisement content allocation amount over the predetermined duration of time is equals a total available advertisement content allocation.

3. The method of claim 1, further comprising:
determining that a conflict exists between the local advertisement content allocation and the general advertisement content allocation during a second particular time period.

4. The method of claim 3, further comprising:
in response to determining that the conflict exists during the second particular time period, determining whether alternative inventory space is available at another time to reinsert conflicting general advertisement content.

5. The method of claim 4, further comprising:
in response to determining that alternative inventory space is available, pulling back the conflicting general advertisement content; and
reinserting the conflicting general advertisement content during a third particular time period.

6. The method of claim 5, wherein:
reinserting the conflicting general advertisement content is automatically inserted into a next-scheduled spot block.

7. The method of claim 1, further comprising:
determining, at the processing device, that a sold amount of general advertisement content during a second particular time period is insufficient to fill the general advertisement content allocation amount specified by the prediction information during the second particular time period, wherein the second particular time period is less than the predetermined duration of time; and
reallocating, for the particular time period, a portion of the general advertisement content allocation amount to the local advertisement content allocation amount for a second particular time period.

8. A processing device comprising:
a processor;
memory coupled to the processor, the memory storing a program of instructions to be executed by the processor, the program of instructions including:
  at least one instruction to receive a log file including prediction information specifying a local advertisement content allocation amount and a general advertisement content allocation amount over a predetermined duration of time;
  at least one instruction to receive a chronological schedule designating a plurality of media content spots and a plurality of advertising spots for the predetermined duration of time;
  at least one instruction to determine that a sold amount of local advertisement content during a particular time period is insufficient to fill the local advertisement content allocation amount specified by the prediction information during the particular time period, wherein the particular time period is less than the predetermined duration of time;
  at least one instruction to reallocate a portion of the local advertisement content allocation amount to the general advertisement content allocation amount for the particular time period, while leaving the local advertisement content allocation amount and the general advertisement content allocation amount unchanged over the predetermined duration of time; and
  at least one instruction to generate a program log in accordance with the prediction information and the reallocation.

9. The processing device of claim 8, wherein:
a sum of the local advertisement content allocation and the general advertisement content allocation amount over the predetermined duration of time is equals a total available advertisement content allocation.

10. The processing device of claim 8, wherein the program of instructions further includes:
at least one instruction to determine that a conflict exists between the local advertisement content allocation and the general advertisement content allocation during a second particular time period.

11. The processing device of claim 10, wherein the program of instructions further includes:
at least one instruction to determine, in response to determining that the conflict exists during the second particular time period, whether alternative inventory space is available at another time to reinsert conflicting general advertisement content.

12. The processing device of claim 11, wherein the program of instructions further includes:
at least one instruction to pull back the conflicting general advertisement content in response to determining that alternative inventory space is available; and
at least one instruction to reinsert the conflicting general advertisement content during a third particular time period.

13. The processing device of claim 12, wherein the program of instructions further includes:
at least one instruction to automatically reinsert the conflicting general advertisement into a next-scheduled spot block.

14. The processing device of claim 8, wherein the program of instructions further includes:
at least one instruction to determine that a sold amount of general advertisement content during a second particular time period is insufficient to fill the general advertisement content allocation amount specified by the prediction information during the second particular time period, wherein the second particular time period is less than the predetermined duration of time; and
at least one instruction to determine reallocate, for the particular time period, a portion of the general advertisement content allocation amount to the local advertisement content allocation amount for a second particular time period.

15. A system comprising:
one or more processors implementing an advertisement scheduling module, the advertisement scheduling module configured to:
  receive a log file including prediction information obtained from a revenue management system, the prediction information specifying a local advertisement content allocation amount and a general advertisement content allocation amount over a predetermined duration of time;
  receive a chronological schedule designating a plurality of media content spots and a plurality of advertising spots for the predetermined duration of time;
the one or more processors further implementing a conflict resolution module, the conflict resolution module configured to:

determine that a sold amount of local advertisement content during a particular time period is insufficient to fill the local advertisement content allocation amount specified by the prediction information during the particular time period, wherein the particular time period is less than the predetermined duration of time;

reallocate a portion of the local advertisement content allocation amount to the general advertisement content allocation amount for the particular time period, while leaving the local advertisement content allocation amount and the general advertisement content allocation amount unchanged over the predetermined duration of time; and the one or more processors further implementing a log generation module, the log generation module configured to:

generate a program log in accordance with the prediction information and the reallocation.

16. The system of claim 15, wherein:
a sum of the local advertisement content allocation and the general advertisement content allocation amount over the predetermined duration of time is equals a total available advertisement content allocation.

17. The system of claim 15, wherein the conflict resolution module is further configured to:
determine that a conflict exists between the local advertisement content allocation and the general advertisement content allocation during a second particular time period.

18. The system of claim 17, wherein the conflict resolution module is further configured to:
determine, in response to determining that the conflict exists during the second particular time period, whether alternative inventory space is available at another time to reinsert conflicting general advertisement content.

19. The system of claim 18, wherein the conflict resolution module is further configured to:
instruct a general advertisement system to pull back the conflicting general advertisement content in response to the conflict resolution module determining that alternative inventory space is available; and
reinsert the conflicting general advertisement content during a third particular time period.

20. The system of claim 19, wherein the conflict resolution module is further configured to:
automatically reinsert the conflicting general advertisement into a next-scheduled spot block.

* * * * *